United States Patent [19] [11] Patent Number: 4,562,558
Ostrander [45] Date of Patent: Dec. 31, 1985

[54] METHOD FOR INTERPRETATION OF SEISMIC RECORDS TO YIELD INDICATING OF THE LITHOLOGY OF GAS-BEARING AND CAPPING STRATA

[75] Inventor: William J. Ostrander, Novato, Calif.

[73] Assignee: Chevron Research Company, San Francisco, Calif.

[21] Appl. No.: 316,013

[22] Filed: Oct. 28, 1981

Related U.S. Application Data

[63] Continuation-in-part of Ser. No. 77,240, Sep. 19, 1979, Pat. No. 4,316,268.

[51] Int. Cl.$^4$ .......................... G01V 1/34; G01V 1/36
[52] U.S. Cl. ....................................... 367/68; 367/74; 367/50; 367/59
[58] Field of Search ....................... 367/38, 40, 43, 47, 367/50, 53, 56, 59, 74; 364/421

[56] References Cited

U.S. PATENT DOCUMENTS 4,316,267 2/1982 Ostrander .............................. 367/59
4,316,268 2/1982 Ostrander .............................. 367/59

Primary Examiner—Nelson Moskowitz
Assistant Examiner—Ian J. Lobo
Attorney, Agent, or Firm—H. D. Messner; Edward J. Keeling

[57] ABSTRACT

The present invention indicates that gas-containing strata of an earth formation have low Poisson's ratios and that the acoustic contrast (with the overburden rock) has a surprising effect as a function of the angle of incidence on a seismic wave associated with an array of sources and detectors: viz., a significant—and progressive—change in P-wave reflection coefficient as a function of the angle of incidence (within a gather of data) indicates the lithology of the reflecting horizon and the capping strata. Thus, lithologic determinations of high-intensity anomalies of gas-containing media is simplified: (i) progressive increases in amplitude intensity of resulting traces generated by the field array as a function of offset between respective source-detector pairs, can be associated with high porosity sandstones; underlying impervious shales; and (ii) progressive decreases in amplitudes of likewise commonly gathered traces, is associated with medium-to-low porosity lime-stones underlying a similar type of shale.

15 Claims, 29 Drawing Figures

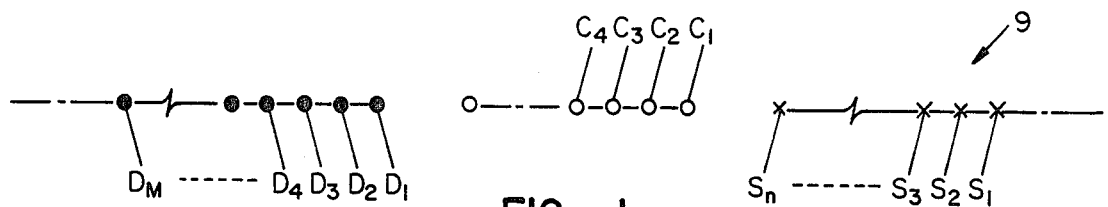
FIG._1.
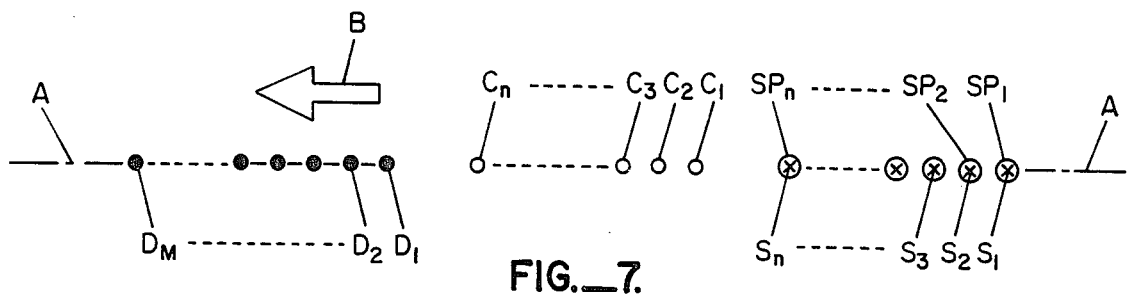
FIG._7.
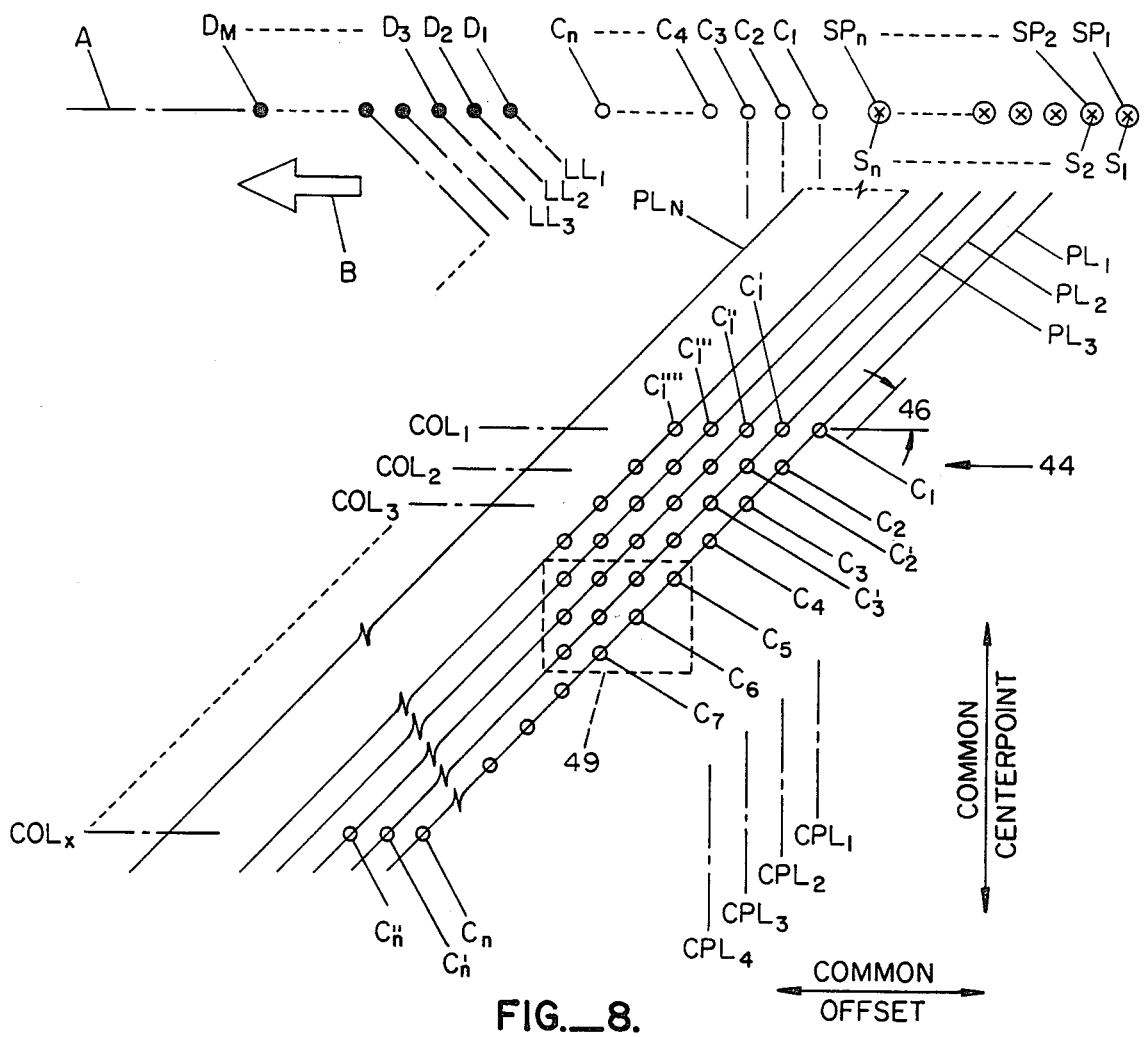
FIG._8.

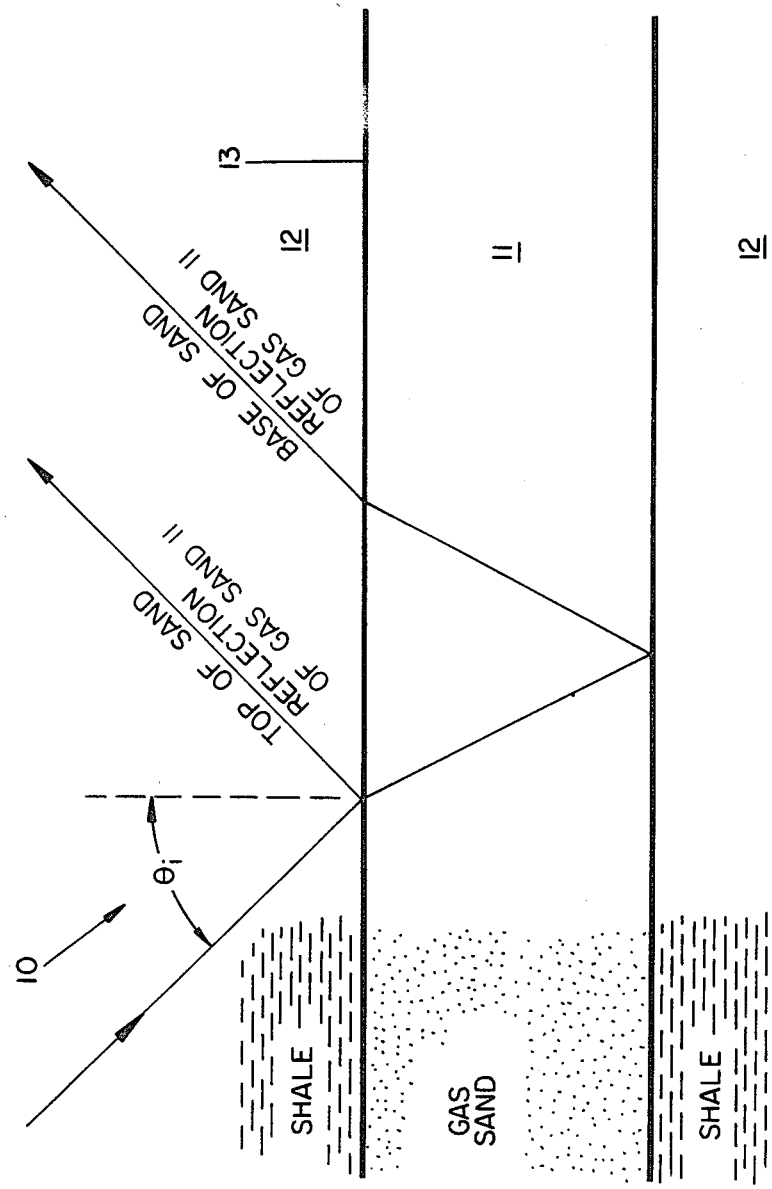

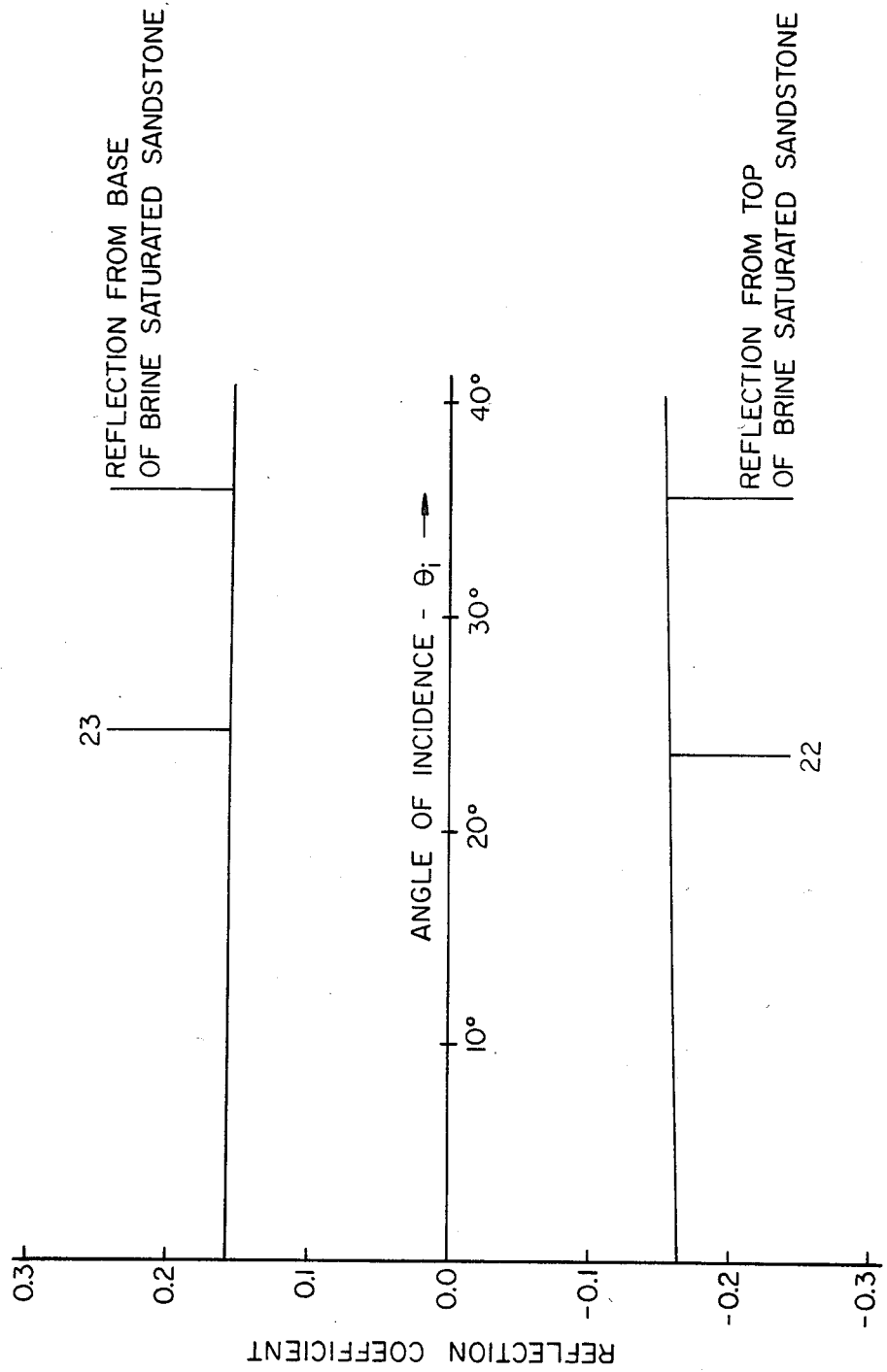
FIG._4.

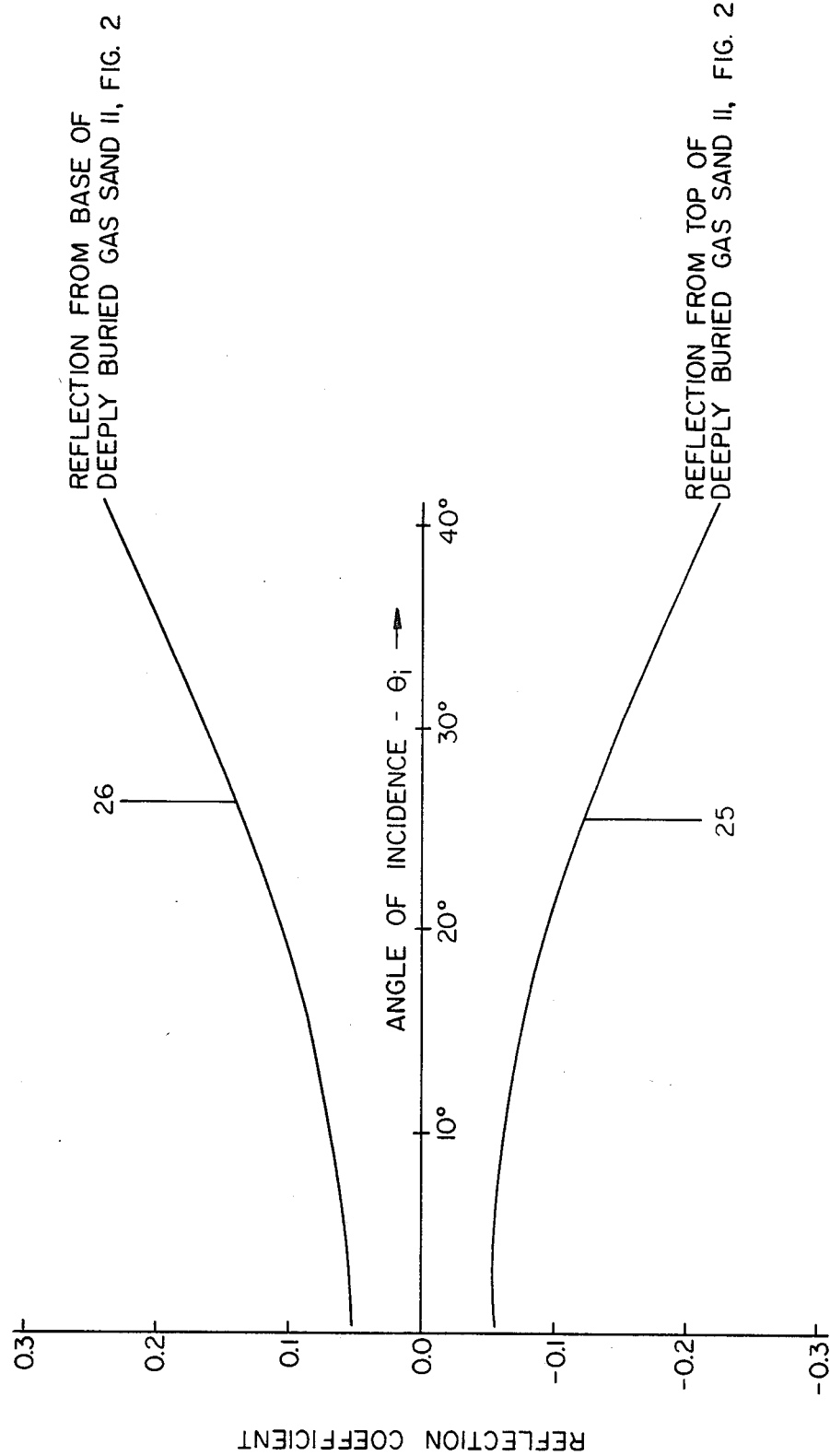
FIG._5.

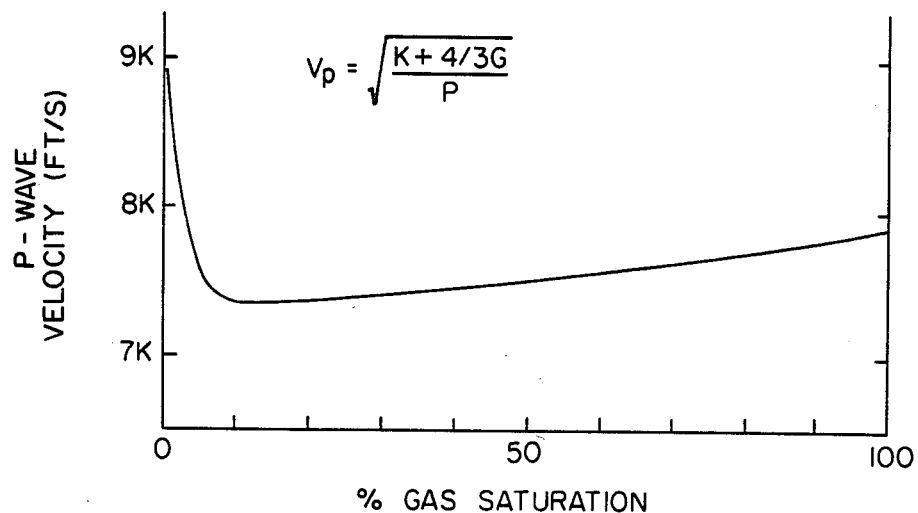
FIG._6a.
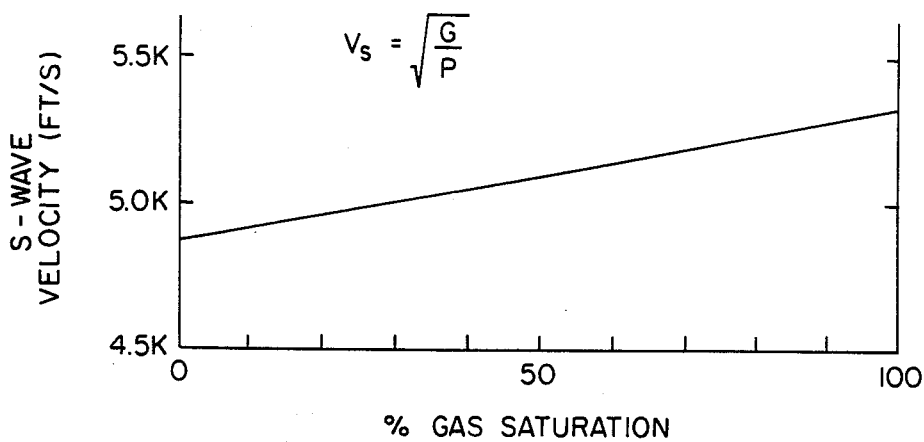
FIG._6b.

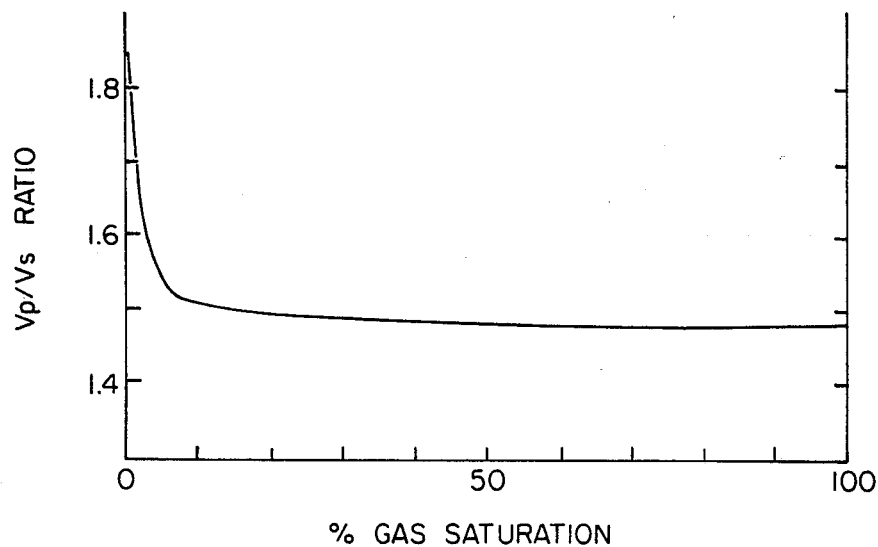
FIG._6c.
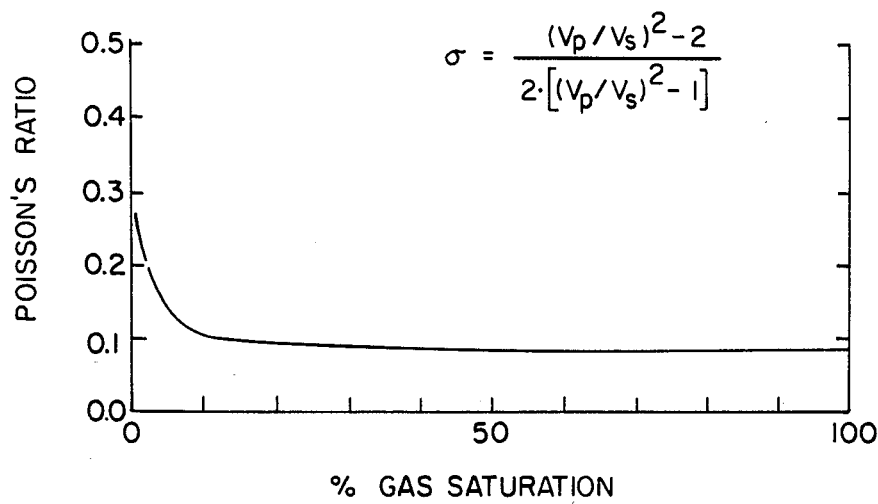
FIG._6d.

GENERATE ADDRESS TAGS FOR ALL
CORRECTED AMPLITUDE-VERSUS-TIME
TRACES INCLUDING HORIZONTAL
OFFSET VALVES ASSOCIATED WITH
PARTICULAR SOURCE-DETECTOR
PAIRS PRODUCING EACH TRACE
AND A CENTERPOINT LOCATION
ALSO ASSOCIATED THEREWITH

CLASSIFY THE CORRECTED TRACES
ON A SELECTION BASIS ASSOCIATING
COMMON EVENTS OF PROGRESSIVELY
CHANGING CHARACTERISTICS WITH
CHANGING HORIZONTAL OFFSET
VALUES, WHEREBY LITHOLOGY OF
STRATA CONTAINING GASEOUS
HYDROCARBONS ARE INDICATED.

FIG _ 9a

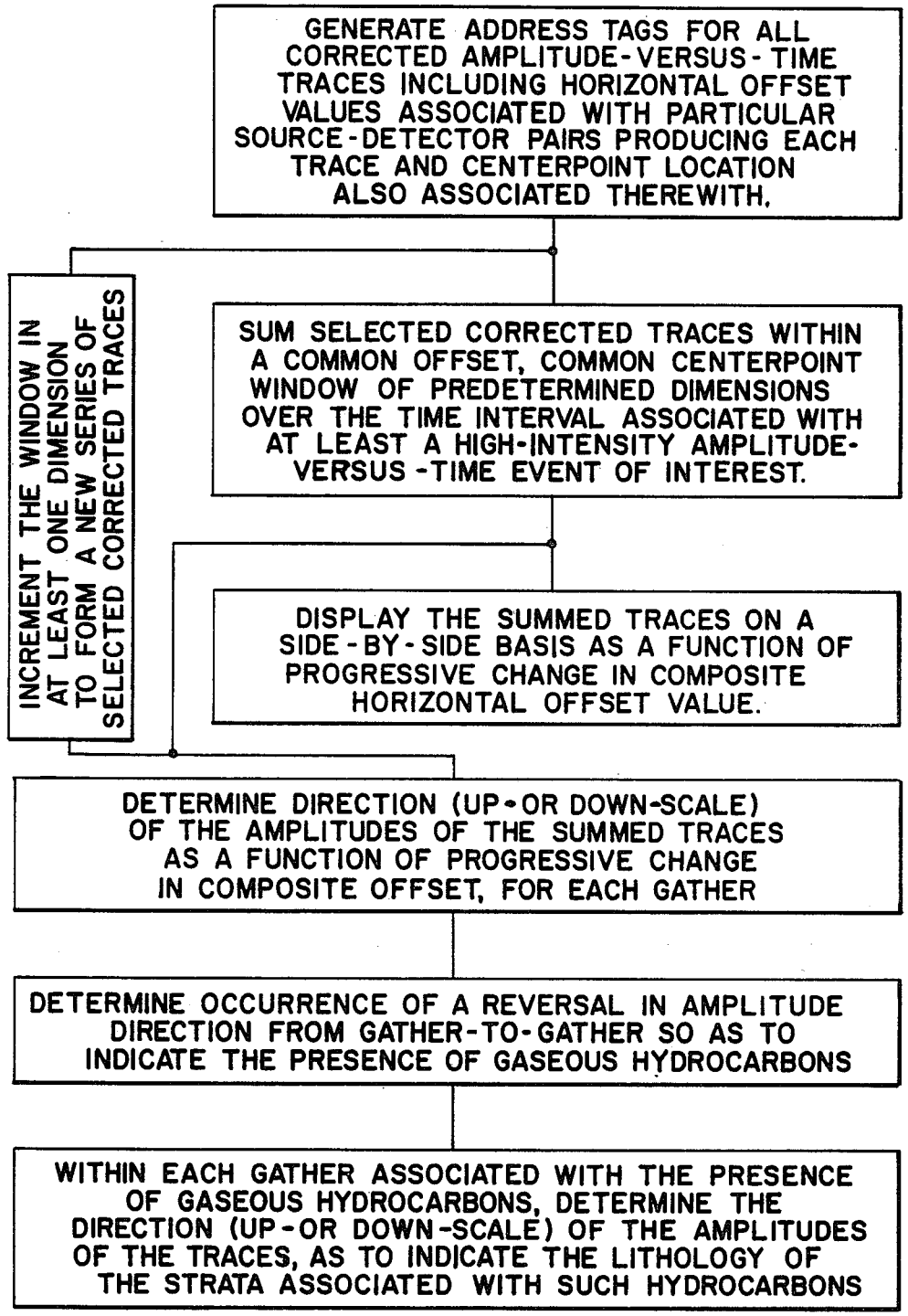
FIG _ 9b

FIG.—11.

SINGLE-FOLD CDP GATHERS
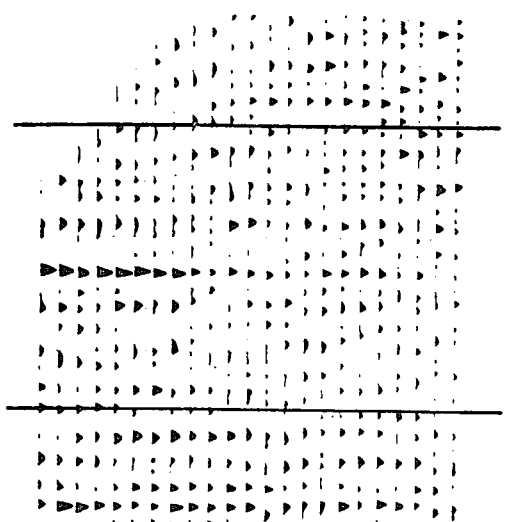
10-FOLD SUMMED CDP GATHERS
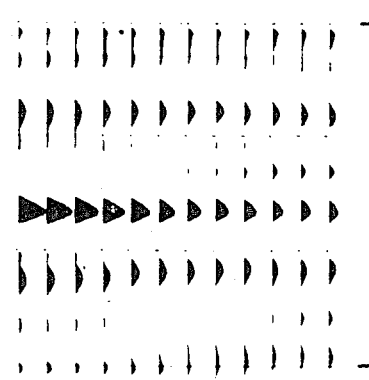
FIG. 13a

SINGLE-FOLD CDP GATHERS
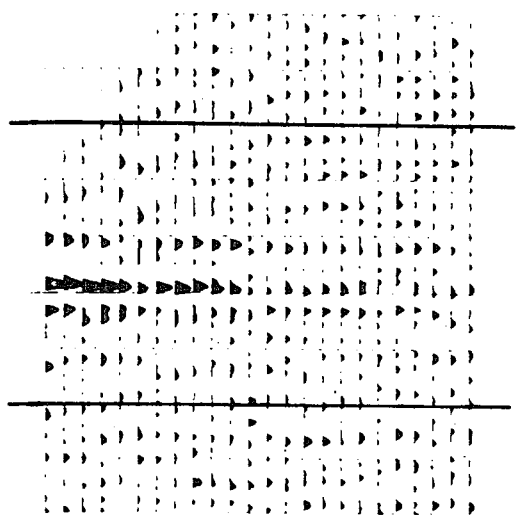
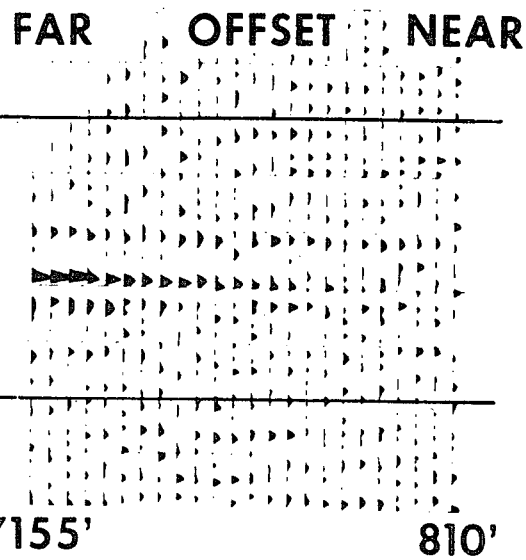
10-FOLD SUMMED CDP GATHERS
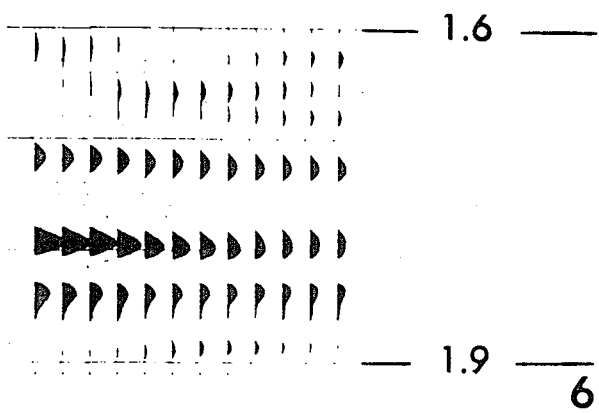
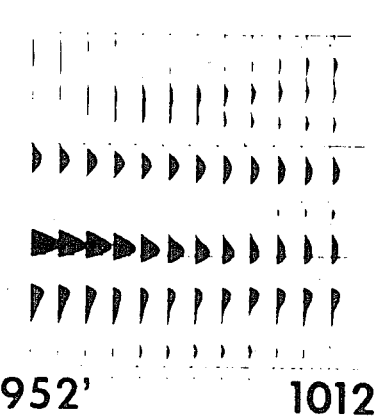
FIG. 13b

METHOD FOR INTERPRETATION OF SEISMIC RECORDS TO YIELD INDICATING OF THE LITHOLOGY OF GAS-BEARING AND CAPPING STRATA

CROSS-REFERENCE TO RELATED APPLICATION

This application is a continuation-in-part of Ser. No. 77,240 for "Method of Interpretation of Seismic Records to Yield Indications of Gaseous Hydrocarbons", filed 9-19-79 assigned to the assignee of the present invention and now issued as U.S. Pat. No. 4,316,268.

FIELD OF THE INVENTION

The present invention pertains to the art of seismic prospecting for petroleum reservoirs by multiple-point surveying techniques, and more particularly to the art of converting high-intensity reflection amplitude anomalies associated with one or more common centerpoints observed on seismic record traces into diagnostic indicators of the lithology of the underlying subsurface strata.

BACKGROUND OF THE INVENTION

For several decades, seismic prospecting for petroleum has involved the creation of acoustic disturbances above, upon, or just below the surface of the earth, using explosives, air guns, or large mechanical vibrators. Resulting acoustic waves propagate downwardly in the earth, and are partially reflected back toward the surface when acoustic impedance changes within the earth are encountered. A change from one rock type to another, for example, may be accompanied by an acoustic impedance change, so that the reflectivity of a particular layer depends on the velocity and density content between that layer and the layer which overlies it, say according to the formula $$C \text{ Reflect (normal)} = AR/Ai = [(V_2 d_2 - V_1 d_1)/(V_2 d_2 + V_1 d_1)]$$

where AR is the amplitude from the reflected signal and Ai is the amplitude of the incident signal; $V_1$ is the velocity of the wave in the overlying medium 1; $V_2$ is the velocity in the medium layer below the contact line; $d_1$ is the density of the overlying medium 1; and $d_2$ is the density of the underlying medium.

In early years, signal traces of the reflected acoustic waves were recorded immediately in the field as visible, side-by-side, dark, wiggly lines on white paper ("seismograms"). At present, the initial reproductions—in a digital format—are on magnetic tape, and finally are reduced to visible side-by-side traces on paper or film in large central computing facilities.

At such centers, sophisticated processing makes possible the distinction of signals from noise in cases that would have seemed hopeless in the early days of seismic prospecting. Until 1965, almost all seismic surveys conducted used an automatic gain control which continuously adjusted the gain of amplifiers in the field to account for decreasing amounts of energy from late reflection arrivals. As a result, reflection coefficients could not be accurately determined. However, with the advent of the expander circuit and binary gain amplifiers, gain of the amplifiers can now be controlled and amplitudes recorded precisely; this makes it possible to conserve not only the special characteristics of the reflections, but also their absolute amplitudes.

Today, more powerful computers with array processors and economical floating point capabilities also now enable modern geophysicists to maintain control of the amplitude of all recorded signals. The "floating point" capability is especially effective in expanding computer work size by a large factor and in eliminating the need for computer automatic gain control.

In summary, as a result of the above advances, reflections from many thousands of feet below the earth's surface can now be confidently detected and followed through sometimes hundreds of side-by-side traces, the shortening or lengthening of their corresponding times of arrival being indicative of the shallowing or deepening of actual sedimentary strata of interest. Still, as a general rule, all that can be hoped for the seismic reflection method is to detect structural interfaces and their deviations from horizontality, so as to define subsurface patterns associated with oil or gas.

Apropos of the above has been use of ultra-high amplitude anomalies in seismic traces to infer the presence of natural gas in situ. Seismic interpreters have used so-called "bright-spot" analysis to indicate several large gas reservoirs in the world, especially in the Gulf Coast of the United States. Such analysis is now rather common in the oil industry, but it is not without its critics. Not only cannot the persistence of such increased amplitude anomalies be taken as confirmation of the lateral extent of the gas reservoir, but also the anomaly itself (in some cases) may not represent reflections of a discontinuity of a gas-bearing medium and its over- or underlying associated rock strata. E.g., experience has shown that in certain situations, similar phenomena occur which can confuse the interpreter. E.g., if the shape of the horizon is such that it focuses the energy back to the surface, it may increase the amplitude of one or more of the records akin to reflections from gas-saturated strata. Lithology of the horizon—singly and in combination—can also have a similar effect, producing high-amplitude reflections in the absence of gas within the pore space of the stratum of interest. Examples of the latter: conglomeratic zones, hard streaks of silt or lime and lignite beds.

The present invention improves the ability of the seismologist to correctly differentiate the lithology associated with high-intensity anomalies of multiple-point-coverage seismic traces of gas-bearing strata from that of similarly patterned reflections of other types of stratigraphic configurations containing no gas accumulations.

SUMMARY OF THE INVENTION

In accordance with the present invention, interpretation of high-intensity seismic events from traces obtained from multiple-point coverage of a subterranean earth formation using an array of source means and detectors adjacent to the earth's surface is obtained to indicate the lithology of gas-bearing strata in a highly surprising and accurate manner. After the field data have been obtained in which the data of common centerpoints are associated with more than one source-detector pair, the data are indexed ("addressed") whereby all recorded traces are indicated as being a product of respective source-detector pairs of known horizontal offset and centerpoint location. Thereafter, after high-intensity amplitude anomalies in the traces are correctly associated with gas-bearing strata the lithology of the host strata can be indicated to a surprisingly accurate degree:

(1) Amplitude anomalies that progressively increase with offset (indicating the host strata contains a hydrocarbon gas) is a sandstone underlying an impervious shale; and (2) Amplitude anomalies that progressively decrease with offset (indicating that the host strata contains a hydrocarbon gas) is a limestone underlying an impervious shale.

A further refinement of the method of the present invention may be in order under some circumstances, say in interpreting data of poor quality where progressive amplitude change as a function of offset of a single common-centerpoint trace, or even single common-centerpoint gathers cannot be resolved. In accordance with this invention, trace summations can prove beneficial in improving record resolution in such cases, say on a basis of a stacking "window" having dimensions indexable in two directions: X common offset values long by Y common centerpoint values wide. For example, where 2400% common-centerpoint stacked traces have been obtained (i.e., 24 traces per gather) by multiple-point-coverage field techniques, each gather can in turn be "de-stacked" to provide original but corrected locational traces. Then on the basis of a stacking window four (4) common offset values long by five (5) common centerpoint values, several such traces, say 10, can be stacked and the stacked trace displayed as a function of offset. Result: lithology of the host strata can be more easily indicated since progressive change in amplitude intensity as a function of similar intensity changes in offset stands out to a greater degree for the interpreter to see.

DESCRIPTION OF THE DRAWINGS

Further features of the invention will become more apparent upon consideration of the following detailed description of the invention when taken in connection with the accompanying drawings, wherein:

FIG. 1 is a plan view of a grid of centerpoints produced in the field by the systematic positioning and energization of an array of seismic sources and detectors whereby a series of locational traces associated with individual centerpoints between respective source-detector pairs are ultimately generated;

FIG. 2 is a model of typical reflecting horizons within an earth formation that can be associated with the characteristics of the locational traces of FIG. 1;

FIGS. 3, 4 and 5 are plots of reflection coefficient as a function of angle of incidence of seismic waves associated with the reflecting horizons of FIG. 2;

FIGS. 6(a), 6(b), 6(c) and 6(d) are plots of various quantities of a mathematical nature, as a function of percentage of gas saturation, illustrating the relationship of Poisson's ratio to the presence of gas within an earth formation;

FIGS. 7 and 8 are plots of centerpoints produced by an array of sources and detectors wherein a geometrical transformation has occurred to better illustrate processes associated with the method of the present invention;

FIGS. 9(a) and 9(b) are flow diagrams of processes akin to those shown in FIGS. 7 and 8 for carrying out the method of the present invention, using a programmed digital computing system;

PREFERRED EMBODIMENTS OF THE INVENTION

Figure 3:
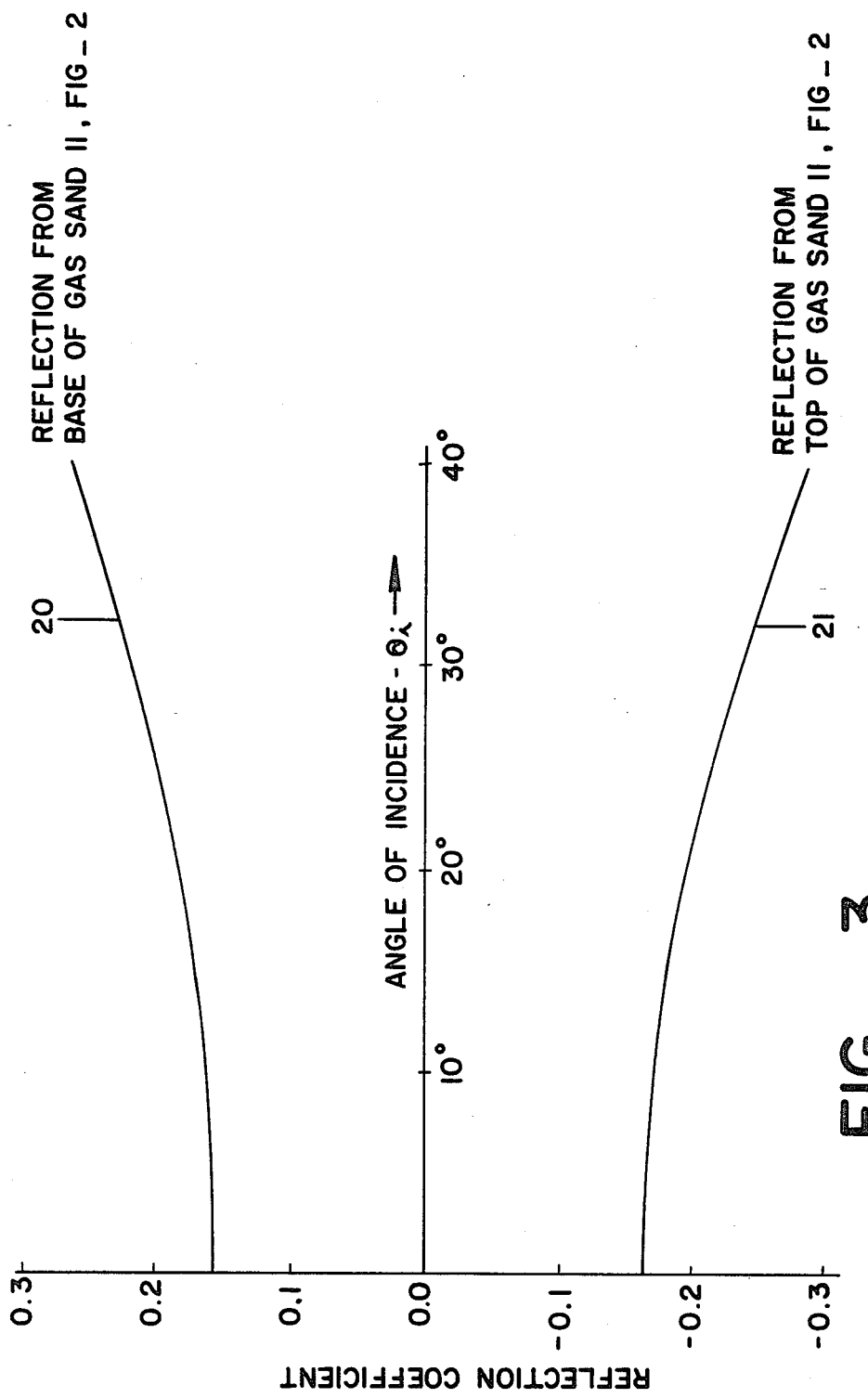

Before discussion of an embodiment of the invention within an actual field environment, a brief description of relevant mathematical and theoretical concepts may prove beneficial and are presented below.

Firstly, it may be of interest to indicate lithology limitations associated with the present invention. For example, anomalies associated with gas sands over shale cap rock are one example in which the method of the present invention offers surprising results; another relates to gas-saturated limestone over shale. Also of importance is the relationship between Poisson's ratio and resulting high-intensity amplitude anomalies provided on seismic traces.

While Poisson's ratio ($\sigma$) has the general formula $$\sigma = \frac{\left(\frac{V_p}{V_s}\right)^2 - 2}{2\left[\left(\frac{V_p}{V_s}\right)^2 - 1\right]}$$

where $V_p$ is compressional velocity and $V_s$ is shear velocity of the medium, this concept also has physical significance. For example, consider a slender cylindrical rod of an elastic material and apply a compressional force to the ends. As the rod changes shape, the length of the rod will decrease by $\Delta L$, while the radius will increase by $\Delta R$. Poisson's ratio is defined as the ratio of the relative change in radius ($\Delta R/R$) to the relative change in length ($\Delta L/L$). Hence a compressible material has a low Poisson's ratio, while an incompressible material (as a liquid) has a high Poisson's ratio.

The equation above also indicates the relationship of the compressional and shear wave velocities of the material, $V_p$ and $V_s$ respectively; i.e., that Poisson's ratio may be determined dynamically by measuring the P-wave and S-wave velocities. Only two of the three variables are independent, however.

Recent published studies on reflection and transmission seismic waves useful in geophysical applications include:

(1) Koefoed, O., 1955, for "On the Effect of Poisson's Ratios of Rock Strata in the Reflection Coefficients of Plane Waves", Geophysical Prospecting, Vol. 3, No. 4.

(2) Koefoed, O., 1962, for "Reflection and Transmission Coefficients for Plane Longitudinal Incident Waves", Geophysical Prospecting, Vol. 10, No. 3.

(3) Muskat, M. and Meres, M. W., 1940, for "Reflection and Transmission Coefficients for Plane Waves in Elastic Media", Geophysics, Vol. 5, No. 2.

(4) Tooley, R.D., Spencer, T. W. and Sagoci H. F., for "Reflection and Transmission of Plane Compressional Waves", Geophysics, Vol. 30, No. 4 (1965).

(5) Costain, J. K., Cook, K. L. and Algermisshi, S. T., for "Amplitude, Energy and Phase Angles of Plane SP Waves and Their Application to Earth Crustal Studies", Bull. Seis. Soc. Am., Vol. 53, p. 1639 et seq.

All of the above have focused on the complex modeling of variation in reflection and transmission coefficients as a function of angle of incidence.

The problem is complicated, however. E.g., isotropic media with layer index of the strata, i=1 for the incident medium and i=2 for the underlying medium, have been modeled using equations for P-wave reflection coefficient $A_{pr}$ and for P-wave transmission displacement amplitude coefficient $A_{pt}$. In such equations, the value of Poisson's ratio ($\sigma$) is required, since both the P-wave and S-wave velocities are utilized. For each of the media, i.e., the incident or underlying medium, three independent variables exist: P-wave velocity, $\sigma$ and bulk density, or a total of six variables for both media. But for a single interface, only four independent variables were required: P-wave velocity ratio, the density ratio, Poisson's ratio in the incident medium and Poisson's ratio in the underlying medium.

But to provide for the many combinations of possible variations, the above-listed studies have either:

(a) generated many (literally thousands) plots of a mathematical nature for various parameters, values in which there was little relationship with true geophysical applications, since the latter were hopelessly obscured and unappreciated; or (b) made simplistic assumptions that, although using actual calculations, nevertheless did not express the true nature of transmission and reflection coefficients, in particular lithological situations associated with the accumulation of gaseous hydrocarbons within an actual earth formation.

In summary, while reference (2) concludes that change in Poisson's ratio in the two bounding media can cause change in the reflection coefficient as a function of angle of incidence, reference (2) does not relate that occurrence to lithology associated with the accumulation of gaseous hydrocarbons in the surprising manner of the present invention.

The present invention teaches that gas-containing strata have low Poisson's ratios and that the contrast with the overburden rock as a function of horizontal offset produces a surprising result: such contrast provides for a significant—and progressive—change in P-wave reflection coefficient at the interface of interest as a function of angle of incidence of the incident wave. Thus, determining the lithology of high-intensity amplitude anomalies of gas media is simplified by relating progressive change in amplitude intensity as a function of offset between source-detector pairs, i.e., angle of incidence being directly related to offset.

Also, the behavior of P-wave travel as a function of lithology and horizontal offset between a respective source-detector pair associated with a given locational trace provide the following amplitude response signatures of interest:

(1) Where the gas-containing media are gas sands underlying shale, such as found in the Gulf Coast, amplitude responses increase with offset; and (2) Where the gas-containing media include limestone underlying shale, such as found in the North Sea, the amplitude anomalies of the interface decrease with offset.

Now in more detail, attention should be directed to the Figures, particularly FIG. 1. Note that, inter alia, FIG. 1 illustrates in some detail how the terms of interest in this application are derived: e.g., the term "centerpoint" is a geographical location located midway between a series of sources $S_1, S_2 \ldots S_n$ of a geophysical field system 9 and a set of detectors $D_1, D_2 \ldots D_m$ at a datum horizon near the earth's surface. The centerpoints are designated $C_1, C_2 \ldots C_p$ in the Figure, and are associated with a trace derived by placement of a source at that centerpoint location followed immediately by relocating a detector thereat.

I.e., if the sources $S_1 \ldots S_n$ are excited in sequence at the source locations indicated, traces received at the different detector locations shown can be related to common centerpoints therebetween. If such traces are summed, a gather or group of traces is formed. I.e., if the reflecting interface is a flat horizon, the depth point where a reflection occurs will define a vertical line which passes through the centerpoint of interest. Applying static and dynamic corrections to the field traces is equivalent (under the above facts) to placing the individual sources $S_1, S_2 \ldots S_n$ at the centerpoint in sequence followed by replacement with the detectors $D_1 \ldots D_m$ of interest at the same locations. If the traces associated with a common centerpoint are summed, a series of enhanced traces, sometimes called CDPS (Common Depth Point Stack) traces, is provided.

FIG. 2 illustrates reflection phenomena of a three-layer model typical of a young, shallow geologic section 10, such as found in the Gulf Coast, illustrating how reflection phenomena associated with the traces associated with the field system 9 of FIG. 1 can be related to the presence of gas.

Section 10 includes a gas sand 11 embedded in a shale stratum 12. Assume a Poisson's ratio of 0.1 for the gas sand and of 0.4 for the shale, a 20% velocity reduction at interface 13, say from 10,000'/sec to 8000'/sec, and a 10% density reduction from 2.40 g/cc to 2.16 g/cc.

The actual P-wave reflection coefficient Apr can be related to section 10 by Equation (1) below; also, P-wave transmission displacement amplitude coefficient Apt can similarly be related in accordance with Equation (2) below.

$$A_{pr} = \frac{\bar{f} - \bar{\tau} - \bar{\chi}}{\bar{f} + \tau\chi} \tag{1}$$

$$A_{pt} = \frac{h_2 \cdot 2a_1 k_1^2 (C_1 \nu + C_2 \xi)}{h_1 (\bar{f} + \bar{\tau} + \bar{\chi})} \tag{2}$$

$$\frac{\bar{f}}{f} = k_1^2 k_2^2 \delta (a_1 c_2 \mp a_2 c_1) \tag{3}$$

$$\frac{\bar{t}}{\tau} = b^2 \eta^2 \mp a_1 c_1 \nu^2 \tag{4}$$

$$\frac{\bar{x}}{\chi} = a_2 c_2 (\xi^2 \mp 4 a_1 c_1 \xi^2 b^2) \tag{5}$$

$$\eta = \delta \epsilon_2 - \epsilon_1 \tag{6}$$
$$\zeta = \delta - 1 \tag{7}$$
$$\nu = \delta \epsilon_2 + 2b^2 \tag{8}$$
$$\xi = \epsilon_1 + 2\delta b^2 \tag{9}$$
$$\epsilon_i = k_i^2 - 2b^2 \tag{10}$$
$$\delta = \mu_2/\mu_1 \tag{11}$$
$$\mu_i = \rho_i V_{si}^2 \tag{12}$$
$$b = h_1 \sin\theta \tag{13}$$
$$a_i^2 = h_i^2 - b^2 \tag{14}$$
$$C_i^2 = k_i^2 - b^2 \tag{15}$$
$$h_i = 1/V_{pi} \tag{16}$$
$$k_i = 1/V_{si} \tag{17}$$

$V_{pi} \equiv$ p-wave velocity
$V_{si} \equiv$ s-wave velocity
$P_i \equiv$ density
$i \equiv$ layer index
$\theta \equiv$ angle of incidence Equations (1) and (2) are, of course, the two basic equations of wave travel in an earth formation and are for isotropic media with the layer index being i=1 for the incident medium and i=2 for the underlying medium. Equations (3) through (17) simply define intermediate variables.

As an example of calculations associated therewith, if $\theta=0°$ (normal incidence), the P-wave reflection coefficient Apr is equal to about $-0.16$ and $+0.16$, respectively.

FIG. 3 illustrates change in reflection coefficient as a function of angle of incidence $\theta$ for the three-layer model of FIG. 2.

Note that solid lines 20, 21 illustrate the effects of reflection (and transmission, by omission) on the base and top of the gas sand. In line 21, at $\theta=0°$, note that the $A_{pr}$ equals $-0.16$; while at $\theta=40°$, the $A_{pr}$ is about $-0.28$. That is, rather a surprisingly large change in the reflection coefficient as a function of angle of incidence occurs, with the greatest change occurring between $\theta=20°$ and $\theta=40°$.

For the bottom layer, line 20 changes at about the same rate, but in opposite sign. I.e., at $\theta=0°$, $A_{pr}$ is about $+0.16$ and at $\theta=40°$, $A_{pr}$ is about $+0.26$. Again, the greatest change in $A_{pr}$ occurs between $\theta=20°$ and $\theta=40°$. As a result, the amplitude of the seismic wave reflected from this model would increase about 70% over the angle of incidence range shown, i.e., over the incremental 40 degrees shown.

While angles of incidence equal to 40° may seem a little large for reflection profiling (heretofore, most data arriving beyond 30° being thought useless and muted out), experience has now nevertheless shown that reflection data can and do arrive at reflection angles greater than 30°. Hence, the angles of incidence must be determined, and one of the more important techniques, the straight-ray approach to estimate such angles of incidence (using depth-to-reflector and shot-to-detector and-shot-to-group offset), is as set forth below:

$$\theta_1 = \arctan(X/2Z) \quad (18)$$

where $\theta_1$ is the angle of incidence; X is the shot-to-detector or shot-to-group offset and Z is the reflector depth. Velocity changes with depth can likewise be accommodated by assuming section velocity change is of the form $V_1=V_0+KZ$ where K is a constant so that all ray paths are arcs of circles having centers $V_0/K$ above the reference plane of interest, say the earth's surface. Thus, the approach should be in accordance with $$\theta_1 = \arctan \frac{ZX + V_0X/K}{Z^2 + 2V_0(Z/K) - (X^2/4)} \quad (19)$$

Having now established a firm mathematical and theoretical basis for the process of the present invention, perhaps a description of how a geological section containing no gas therein would affect impedance contrast is in order. FIG. 4 illustrates the changes in reflection coefficient as a function of angle of incidence $\theta$ in the manner of FIG. 3, but in which the gas sand 10 of FIG. 2 contains no gas, simulating, e.g., a low-velocity, brine-saturated, young sandstone embedded in shale.

The solid lines 22, 23, representing reflection coefficients, are seen to be about horizontal between $\theta=0°$ and 40°, slightly decreasing in magnitude as the angle of incidence increases, i.e., as $\theta$ approaches 40°. In the above example, it should be noted that the Poisson's ratio of the sandstone was assumed to be 0.4.

FIG. 5 illustrates yet another plot associated with a three-layer model akin to that shown in FIG. 2, but in which the sandstone contains gas but is buried deep below the earth's surface. The values for the three-layer model of FIG. 2 are again used except that the velocity change from shale to sand is only 10%, or from 10,000'/sec to 9000'/sec. As shown, curves 25, 26 are even more significant: both curves are seen to increase in magnitude from over the 40° of change in the angle of incidence. However, field results have not verified these results, since Poisson's ratio in such gas sands may be strongly affected by depth, and not be as low as is now surprisingly taught by the present invention.

FIGS. 6(a), 6(b), 6(c) and 6(d) offer a possible explanation for low Poisson's ratio in gas-containing strata in general and in gas sands in particular. In the Figures, various quantities are plotted as a function of percentage of gas saturation. In FIG. 6(a), P-wave velocity is so plotted; in FIG. 6(b), S-wave velocity is depicted; in FIG. 6(c), the ratio of Vp/Vs is the value of interest; and in FIG. 6(d), Poisson's ratio is shown as a function of percent gas saturation.

Note that FIGS. 6(a) and 6(b) are for sandstones buried at 6000 feet with 35% porosity. FIGS. 6(c) and 6(d) result from FIGS. 6(a) and 6(b) using appropriate equations. But in FIG. 6(d), Poisson's ratio drops from about 0.3 to 0.1 from 0% to 10% gas saturation; on the other hand, the same ratio changes very little from 10% to 100% gas saturation (average value is about 0.09).

Hence, from the above mathematical and theoretical concepts, displays of reflection data can now be used to indicate change in reflection coefficient as a function of angle of incidence. Such data are also now conveniently available, say using today's conventional field-gathering techniques involving multiple-area coverage, since the former can be derived from and is compatible with one of today's conventional forms of recorded reflection seismic data: common-depth-point (CDP) gathers. And, progressive changes in reflection amplitude vs. shot-to-detector (group) offset can form the basis of such a determination, since offset of any particular source-detector pair is directly related to the angle of incidence in accordance with Equation (19), supra.

But corrected locational trace data, before stacking in accordance with CDPS techniques, often have poor signal-to-noise ratios. Thus, changes in amplitude vs. offset may be difficult to observe in such data.

FIG. 7 is a diagram which illustrates a data "addressing" technique which improves amplitude versus offset resolution in such situations; in the Figure, the traces were generated using an end-shooting array of 48 detectors with source and detectors advancing one detector interval per shot point. Result: a 24-fold CDP-stacked record section was generated. Note further: each centerpoint is associated with 24 separate traces of varying offset.

In order to geometrically associate each generated locational trace with its common centerpoint, address guidance, as provided by FIG. 7, is important. To understand the nature of FIG. 7, assume that the sources $S_1, S_2 \ldots S_n$ are sequentially located at shotpoints $SP_1, SP_2 \ldots SP_n$ at the top of the Figure. Assume also that the detectors are placed in line with the sources, i.e., along the same line of survey A at the detector locations $D_1, D_2 \ldots D_m$. After each source is activated, reflections are received at the detectors, at the locations shown. Then by the "rollalong" technique, the source and detector spreads can be moved in the direction B of survey line A and the process repeated to provide a series of traces. The latter are associated with centerpoints midway between the respective detector-source pairs. In the Figure, assume source $S_1$ has been located at shotpoint $SP_1$ and excited. Midway between $SP_1$ and each of the detectors, at $D_1,D_2 \ldots D_m$ is a series of centerpoints $C_1,C_2 \ldots C_n$. The latter are each associated with a trace. In this regard and for a further description of such techniques, see U.S. Pat. No. 3,597,727 for "Method of Attenuating Multiple Seismic Signals in the Determination of Inline and Cross-Dips Employing Cross-Steered Seismic Data", Judson et al, issued Aug. 3, 1971, and assigned to the assignee of the present application. With appropriate static and dynamic corrections, the data can be related to the common centerpoints midway between individual source points and detectors, as discussed in the above-noted reference.

But by such a field technique, data provided generate 24 separate traces associated with the same centerpoint $C_1 \ldots C_n$. In order to index ("address") these traces as a function of several factors including horizontal offset and centerpoint location, a stacking chart 44 as shown in FIG. 8 has been developed.

Chart 44 is a diagram in which a trace is located along a plurality of oblique common profile lines $PL_1,PL_2 \ldots$ , between a series of common offset and centerpoint locations at 90 degrees to each other. For best illustration, focus on a single shotpoint, say $SP_1$, and on a single detector spread having detectors $D_1,D_2 \ldots D_m$ of FIG. 8 along survey line A. Assume a source is located at shotpoint $SP_1$ and activated thereafter. The detector spread and source are "rolled" forward along survey line A in the direction B, being advanced one station per activation. Then after detection has occurred, and if the resulting centerpoint pattern is rotated 45° about angle 46 to profile line $PL_1$ and projected below the spread as in FIG. 8 as a function of common offset values and centerpoint positions, the chart 44 of FIG. 8 results. Of course, each centerpoint has an amplitude vs. time trace associated therewith, and for didactic purposes that trace can be said to project along a line normal to the plane of the Figure.

It should be emphasized that the centerpoints provided in FIGS. 7 and 8 are geographically located along the line of survey A in line with the source points $SP_1,SP_2 \ldots$. As the locational traces are generated, the chart 44 aids in keeping a "tag" on each resulting trace. As the detector spread and sources are rolled forward one station and the technique repeated, another series of traces is generated associated with centerpoints on new profile line $PL_2$. That is, although the centerpoints are geographically still associated within positions along the survey line A of FIG. 7, by rotation along the angle 46, the new centerpoint pattern $C_1',C_2' \ldots C_n'$ can be horizontally and vertically aligned with centerpoints previously generated. I.e., at common offset values (in horizontal alignment) certain centerpoints are aligned, viz, centerpoint $C_1$ aligns with $C_1'$ as shown; further $C_2$ is aligned with $C_2'$, etc. Also, there are traces that have common centerpoints. I.e., at common centerpoints (in vertical alignment) centerpoint $C_2$ aligns with centerpoint $C_1'$, and centerpoints $C_3,C_2'$ and $C_1''$ are similarly aligned. Thus, via chart 44, each trace associated with a centerpoint can be easily "addressed" as to:

(i) its actual geographical location (i.e., along phantom lines normal to diagonal profile lines $PL_1,PL_2 \ldots$ along common location lines $LL_1,LL_2 \ldots$), so that its actual field location is likewise easily known;

(ii) its association with other traces along common horizontal offset lines $COL_1,COL_2 \ldots COL_x$; and (iii) its association with still other traces along common vertical centerpoint locations lines $CPL_1,CPL_2 \ldots$ Also, "addressing" the traces by (ii) and (iii) allows such traces to be easily combined (summed) by calling out "windows" within the chart in which any traces within the window can be summed. E.g., it has been found convenient to establish a standard window "width" equal to an increased group centerpoint line ($\Delta CPL$) value of say 5, and a window "height" equal to an incremental common group offset line ($\Delta COL$) value of say 4; hence by indexing the intersecting window intervals on a sequential basis, summation of traces therein can occur. The results are summed traces which are outputted to a display on a side-by-side basis, say as a function of amplitude intensity as a function of increasing or decreasing offset between respective source-detector pairs. Actual offset values are not required, since relative values are usually sufficient for most diagnostic purposes.

To establish that the display clearly relates to strata containing gaseous hydrocarbons, may require the interpreter to investigate certain conditional relationships involving that data. For example, the interpreter may determine if the strata of interest extends over several gathers. This requires that the interpreter isolate a reflecting strata of interest and then follow its amplitude versus offset character from one set of gathers to another. In this regard, my parent application, op. cit., teaches that zones of gaseous hydrocarbon accumulation can be accurately identified by determining if first, high-intensity events exist in the trace gathers of interest and then next if the events can be associated with the presence of gaseous hydrocarbons, viz., answering the question, "Does the amplitude of such events change progressively as a function of horizontal offset?", in the affirmative. Such a conclusion presupposed a precursor step in which the events of interest (from one gather with same event in another gather) are contrasted with each other. And if there appears to be a detectable change in the amplitude character of the event of interest, say a reversal in UP- or DOWN-scale trend, then the conclusion that such change was brought about by the presence of gaseous hydrocarbons has a high probability of being true. The present invention adds to interpreting capability of such records as to the lithologic character of the underlying strata.

Assume for teaching purposes, that initially the amplitude of the event of interest first decreased as a function of offset from one gather to another, and then dramatically increased as a function of offset in a third gather. In such a situation, the high-intensity event associated wih the third gather is more likely than not due to the presence of gaseous hydrocarbons in the strata of interest while the amplitude changes of the first and second gathers represents an acoustic contrast associated with non-gas bearing strata.

Next, the interpreter determines the direction of change of the event associated with the strata containing the gaseous hydrocarbons. That is to say, he determines if the amplitude of the event in the third gather increases or decreases with horizontal offset, from which, in accordance with the present invention, he can determine the lithologic character of the gas-bearing strata based upon progressive amplitude reversal of the event of interest within the third gather of data over that in the first and second gathers.

In carrying out the above processes on a high-speed basis, a fully programmed digital computer can be useful. But electromechanical systems well known in the art can also be used. In either case, the field traces must first undergo static and dynamic correction before the traces can be displayed as a function of offset to determined their potential as a gas reservoir. Such correction techniques are well known in the art—see, e.g., U.S. Pat. No. 2,838,743, of O. A. Fredriksson et al, for "Normal Moveout Correction with Common Drive for Recording Medium and Recorder and/or Reproducing Means", assigned to the assignee of the present application, in which a mechanical device and method are depicted. Modern processing today uses properly programmed digital computers for that task in which the data words are indexed as a function of, inter alia, amplitude, time, datum height, geographical location, group offset, velocity, and are manipulated to correct for the angular and horizontal offset; in this latter environment, see U.S. Pat. No. 3,731,269, Judson et al, issued May 1, 1973, for "Static Corrections for Seismic Traces by Cross-Correlation Method", a computer-implemented program of the above type also assigned to the assignee of the present invention. Electromechanical sorting and stacking equipment is also well known in the art and is of the oldest ways of canceling noise. See, for example, the following patents assigned to the assigne of the present invention which contain sorting and stacking techniques, including beam steering techniques:

| U.S. Pat. No. | Issued | Inventor | Title |
| --- | --- | --- | --- |
| 3,597,727 | 12/30/68 | Judson et al | Method of Attenuating Multiple Seismic Signals in the Determination of Inline and Cross-Dips Employing Cross-Steered Seismic Data |
| 3,806,863 | 4/23/74 | Tilley et al | Method of Collecting Seismic Data of Strata Underlying Bodies of Water |
| 3,638,178 | 1/25/72 | Stephenson | Method for Processing Three-Dimensional Seismic Data to Select and Plot Said Data on a Two-Dimensional Display Surface |
| 3,346,840 | 10/10/67 | Lara | Double Sonogramming for Seismic Record Improvement |
| 3,766,519 | 10/16/73 | Stephenson | Method for Processing Surface Detected Seismic Data to Plotted Representations of Subsurface Directional Seismic Data |
| 3,784,967 | 1/8/74 | Graul | Seismic Record Processing Method |
| 3,149,302 | 9/15/74 | Klein et al | Information Selection Programmer Employing Relative Amplitude, Absolute Amplitude and Time Coherence |
| 3,149,303 | 9/15/64 | Klein et al | Seismic Cross-Section Plotter |

FIGS. 9(a) and 9(b) are flow diagrams illustrative of a computer-dominated process in which the functions required by the method of the present invention can be easily ascertained. Preliminary to the steps shown in FIG. 9(a), assume that a section of seismic data has been analyzed for "bright spots"; such events are known by geographical location and/or a time/depth basis; and the traces have been dynamically and statically corrected, as hereinbefore described.

The steps of FIG. 9(a) include generating addresses for the data that include common offset addresses in the manner of FIG. 8, common centerpoint addresses and actual geographical locational addresses, also in the manner of FIG. 8. The corrected traces are classified whereby the character of the amplitude event of interest is indicated as a function of changing horizontal offset values. If the event progressively changes as a function of offset, in the manner previously described, and there is a high likelihood that the event is indicative of strata containing gaseous hydrocarbons, based on amplitude reversal, then the lithology of the host strata is easily determined based n the assumptions and operations previously mentioned.

In more detail, after the addresses have been generated, trace amplitude summation can also occur as suggested in FIG. 9(b) on a predetermined selection basis: adding traces within a selected "window", say window 49 bounded by common group centerpoint lines ($\Delta$CPL) and common group offset lines ($\Delta$COL) (see FIG. 8), usually the "width" ($\Delta$CPL) of window 49 is held constant, and the window "height" ($\Delta$COL) is incremented, frame-by-frame, to change common offset values on a progressive basis, say from near offset values to far offset values. E.g., in FIG. 8, holding the window "width" constant and beginning at the lower boundary of the chart 44, the window "height" ($\Delta$COL) can be incremented until the upper plot boundary is reached. Equipment-wise, the addresses of the boundary lines in the line and column directions are compared—within each window frame. When the comparison is a match, the address register is incremented, and the process repeated for the next window frame.

Of course, if the edge of a gas field is to be determined, the above-mentioned process would be sequentially elongated toward a side of the chart 44 of FIG. 8 in a direction along the survey line. I.e., to say, after the window "height" has been incremented to its far offset value and the results displayed, the window "width" is incremented a common group centerpoint interval ($\Delta$CPL) and the process repeated and the results displayed.

After the summed traces are tagged on the basis of changing common offset, say near through far offset, summed traces can be displayed, if desired. Usually, additional processing of the data occurs however and if the amplitudes exhibit the required characteristics, as previously stated, a determination of the lithology of the strata associated with the gas structure can be made.

Preferably, the aim of the additional processing steps is to determine the direction of amplitude change with offset (as a function of gather number) and via a series of decision boxes, predict the lithology of the gas-bearing sand.

E.g., (1) the direction of change of amplitudes of a common event, in a gather, say from near to far offset values, can be indicated by subtracting the absolute values of adjacent amplitude values in a common up- or down-scale direction. Thus, if the amplitudes increase with offset, then the character of the change direction (of the particular gather) can be considered positive (ONE). Likewise, if the amplitudes decrease with offset, then the character of the change can be considered negative (ZERO).

It should be noted that my parent application op. cit. teaches that zones of gaseous hydrocarbons can be accurately identified by determining whether or not the amplitudes of high-intensity events change progressively as a function of horizontal offset. Such a conclusion presupposes the precursor step of contrasting the amplitude change characteristic (ONE or ZERO) from the gather of interest with that of its adjacent neighboring gather (identified as being non-gas bearing). And where there appears to be a detectable reversal in the character of the amplitude change (from a ONE to a ZERO or vice versa), then the conclusion that such change was brought about by the presence of gaseous hydrocarbons has a high probability of being true.

Finally, within the gather associated with the gas-bearing strata, the direction of the amplitude change is used to determine lithology, based on the ONE or ZERO classification of the change character. For example, if the amplitude change character is ONE, i.e., amplitude increasing with offset, then the gas-bearing strata, more likely than not, will be a sandstone underlying an impervious shale.

Figure 10:
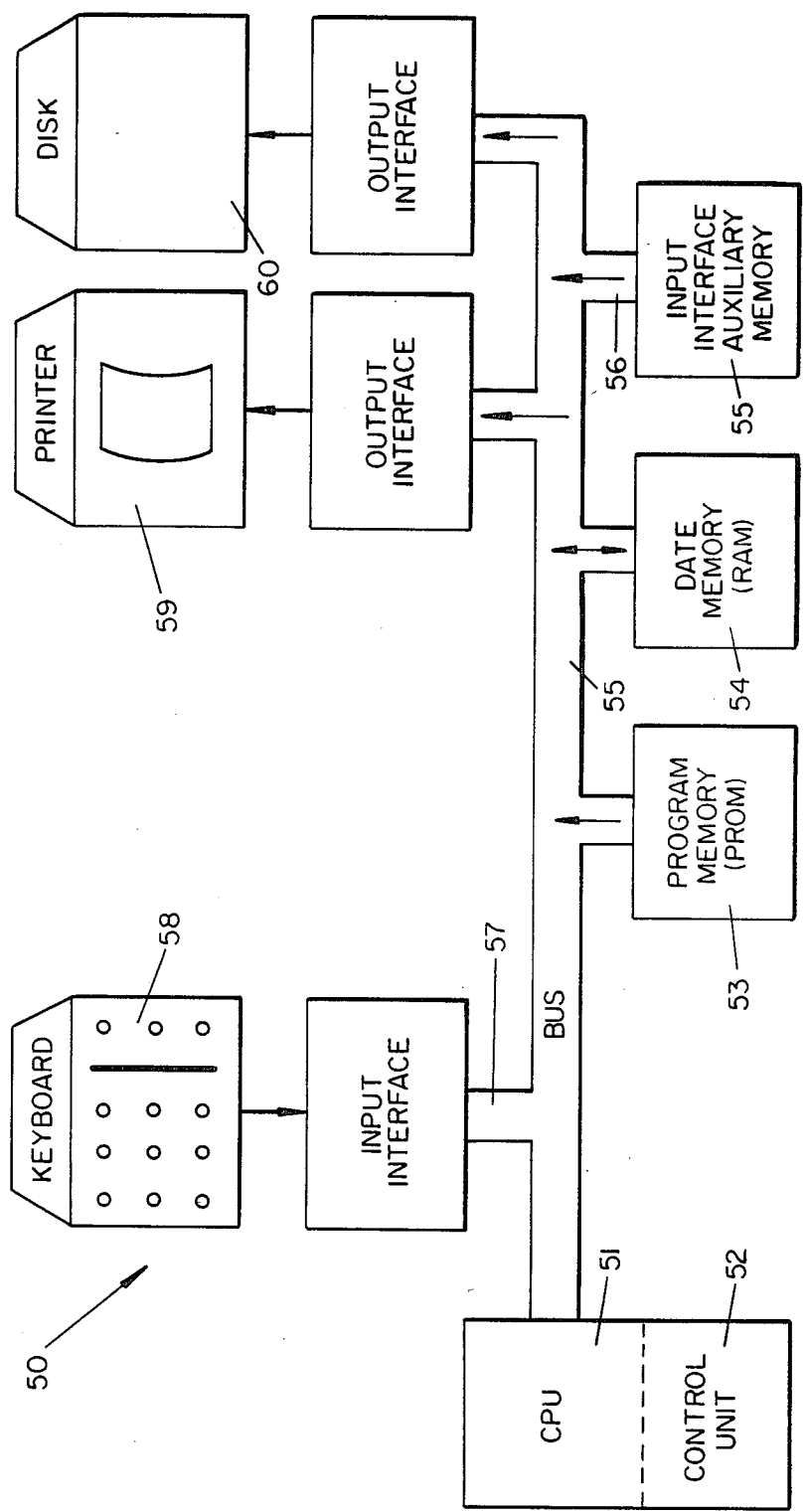
FIGS. 10 and 11 are schematic diagrams of elements within the digital computing system of FIG. 9.

FIG. 10 illustrates particular elements of a computing system for carrying out the steps of FIGS. 9(a) and 9(b). While many computing systems are available to carry out the process of the invention, perhaps to best illustrate operations at the lowest cost per instruction, a microcomputing system 50 is didactically best and is presented in detail below. The system 50 of FIG. 10 can be implemented on hardware provided by many different manufacturers, and for this purpose, elements provided by Intel Corporation, Santa Clara, Calif., may be preferred.

Such a system 50 can include a CPU 51 controlled by a control unit 52. Two memory units 53 and 54 connect to the CPU 51 through BUS 55. Program memory unit 53 stores instructions for directing the activities of the CPU 51 while data memory unit 54 contains data (as data words) related to the seismic data provided by the field acquisition system. Since the seismic traces contain large amounts of bit data, an auxiliary unit 55 can be provided. The CPU 51 can rapidly access data stored through addressing the particular input port, say at 56 in the Figure. Additional input ports can also be provided to receive additional information as required from usual external equipment well known in the art, e.g., floppy disks, paper-tape readers, etc., including such equipment interfaced through input interface port 57 tied to a keyboard unit 58 for such devices. Using clock inputs, control circuitry 52 maintains the proper sequence of events required for any processing task. After an instruction is fetched and decoded, the control circuitry issues the appropriate signals (to units both inernal and external) for initiating the proper processing action. Additionally, results of conditional decisions related the determination of the trend of UP- or DOWN-scale amplitude direction of the events of interest with offset, must be sorted and stored for future analysis. Such decisions are automatically initiated and the results relate primarily to codifying the amplitudes of the events (after picking), determining their UP- or DOWN-scale trend and then determining if the trend is a reversal of prior calculated data. Depending on whether or not a reversal is found (assume that it has been), the reversal is highlighted and the direction of the amplitude change is compared with single-variable lithology table so as to indicate the lithology of the gas-bearing strata. With regard to the operation of the latter table, it comprises a LOOK-UP function in which the UP- or DOWN-scale trend of the amplitude direction (with offset) of the individual gather triggers the printing of an appropriate lithologic tag.

For outputting information, the system 50 can include a printer unit 59 by which the results of the above lithology determination step (after the control unit 52 interrogates the lithology LOOK-UP table) are printable.

Of more use as an output unit, however, is disk unit 60, which can temporarily store the data. Thereafter, an off-line digital plotter capable of generating a series of displays is used in conjunction with the data on the disk unit 60. Such plotters are available in the art, and one propietary model that I am familiar with uses a computer-controlled CRT for optically merging onto photographic paper, as a display mechanism, the seismic data. Briefly, in such a plotter the data are converted to CRT deflection signals; the resulting beam is drawn on the face of the CRT and the optically merged record of the event indicated, say via photographic film. After a predetermined number of side-by-side lines have been drawn, the film is processed in a photography laboratory and hard copies returned to the interpreters for their review.

Figure 11:
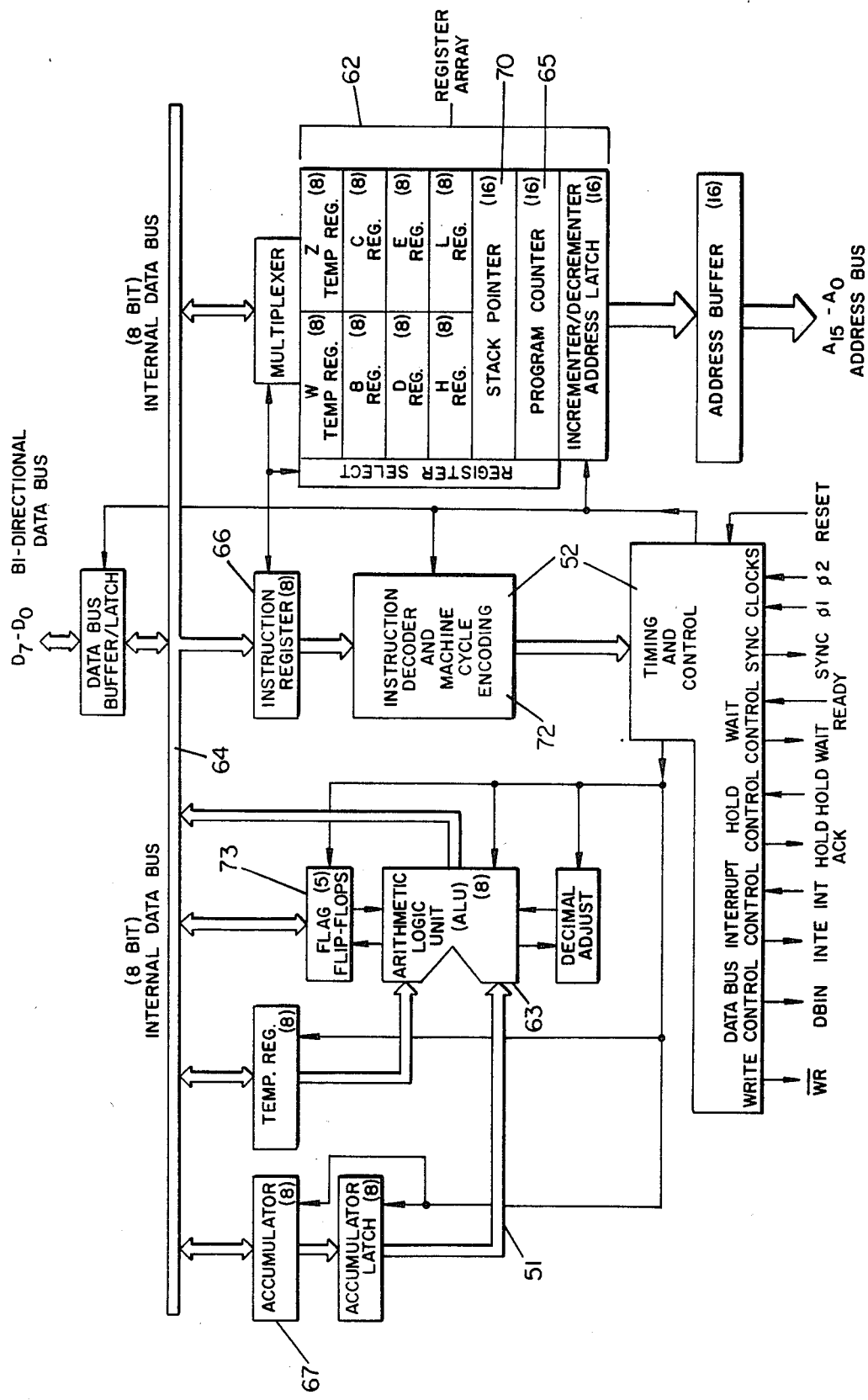

FIG. 11 illustrates CPU 51 and control unit 52 in more detail.

As shown, the CPU 51 includes an array of registers generally indicated at 62 tied to an ALU 63 through an internal data bus 64 under control of control unit 52. The registers 62 are temporary storage areas. Program counter 65 and instruction register 66 have dedicated uses; the other registers, such as accumulator 67, have more general uses.

The accumulator 67 usually stores one of the seismic operands to be manipulated by the ALU 63. E.g., in the summation of traces, the instruction may direct the ALU 63 to not only add in sequence the contents of the temporary registers containing predetermined trace amplitudes together with an amplitude value in the accumulator, but also store the result in the accumulator itself. Hence, the accumulator 67 operates as both a source (operand) and a destination (result) register. The additional registers of the array 62 are useful in manipulation of seismic data, since they eliminate the need to shuffle results back and forth between the external memory units of FIG. 10 and accumulator 67. In practice most ALU's also provide other built-in functions, including hardware subtraction, boolean logic operations, and shift capabilities. The ALU 63 also can utilize flag bits generated by FF unit 73 which specify certain conditions that arise in the course of arithmetical and logical manipulations. Flags typically include carry, zero, sign, and parity. It is possible to program jumps which are conditionally dependent on the status of one or more flags. Thus, for example, the program may be designed to jump to a special routine if the carry bit is set following an addition instruction.

Instructions making up the program for operations involving seismic data are stored in the program memory unit 53 of the CPU 51 of FIG. 11. The program is operated upon in a sequential manner except when instructions in the memory units 53, 54 call for special commands such as "jump" (or "call") instructions. While the program associated with the present invention is a relatively straight-forward one, hence avoiding most "jump" and "call" instructions, "call" instructions for subroutines are common in the processing of seismic data and could be utilized, if desired. In "call" instructions, the CPU 51 has a special way of handling subroutines in order to insure an orderly return to the main program. When the processor receives a call instruction, it increments the program counter 65 and notes the counter's contents in a reserved memory area of the memory unit known as the "stack".

CPU's have different ways of maintaining stack contents. Some have facilities for the storage of return addresses built into the CPU itself; other CPU's use a reserved area of external memory as the stack and simply maintain a "pointer" register, such as pointer register 70, FIG. 11, which contains the address of the most recent stack entry. The stack thus saves the address of the instruction to be executed after the subroutine is completed. Then the CPU 51 loads the address specified in the call into its program counter 65. The next instruction fetched will therefore be the first step of the subroutine. The last instruction in any subroutine is a "return". Such an instruction need specify no address.

EXAMPLES

Diagnostic capability provided by the method of the present invention is better illustrated in the Examples set forth below.

EXAMPLE I

Figure 12:
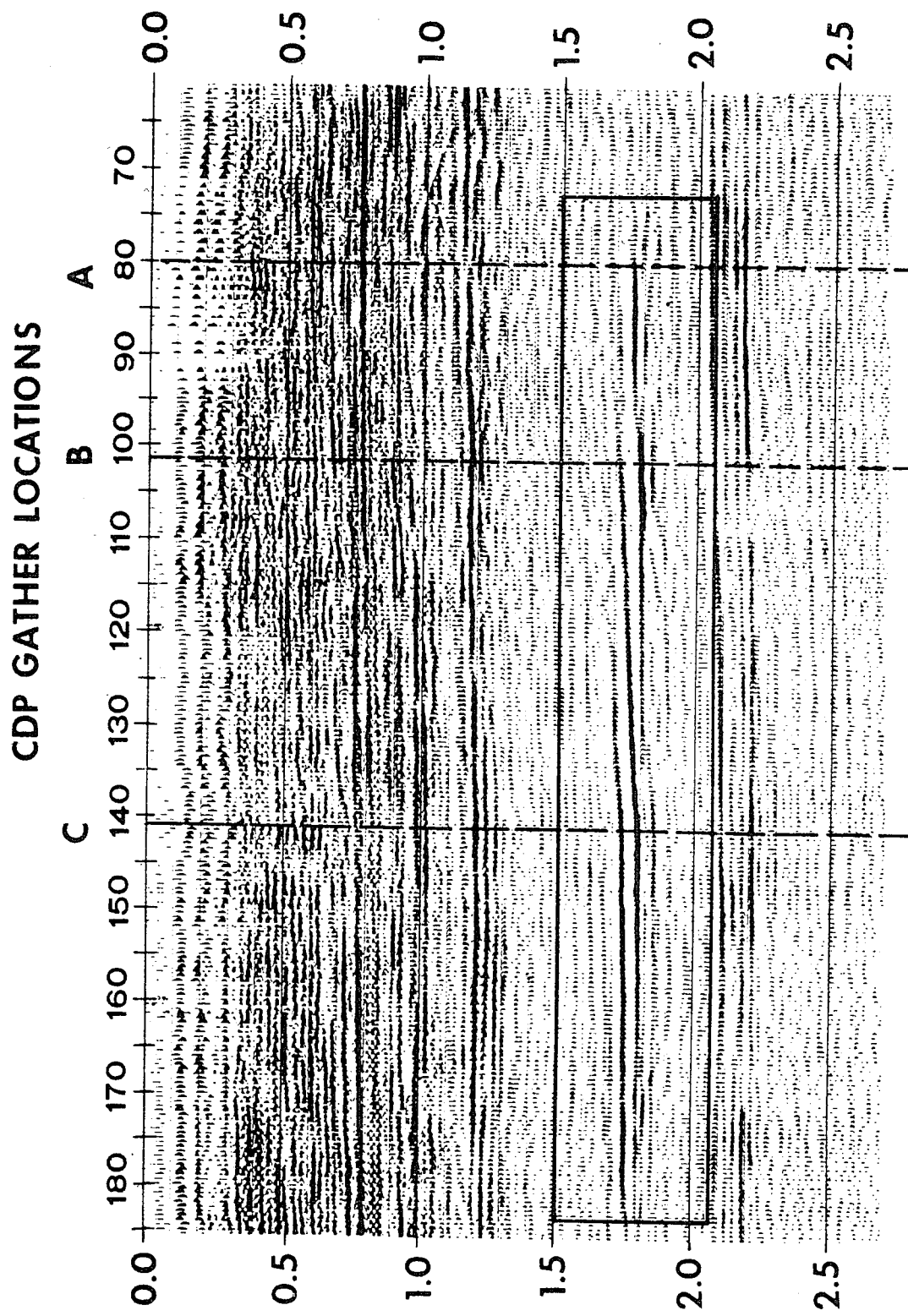
FIGS. 12–21 are true seismic record sections and portions of sections, illustrating the diagnostic capability of the method of the present invention.

Seismic data were obtained over a gas field near Sacramento, Calif. These data, in CDP-stacked form, are shown in FIG. 12. The field, discovered in 1972, consists of 100-foot sand which is almost fully gas-saturated. The discovery well is located at about SP-86 of FIG. 2, with the currently developed portion of the field extending from about SP-75 to SP-115. Gas occurs at a depth of about 7000 feet, which corresponds to a time of about 1.75 seconds on the plot.

Figure 13C:
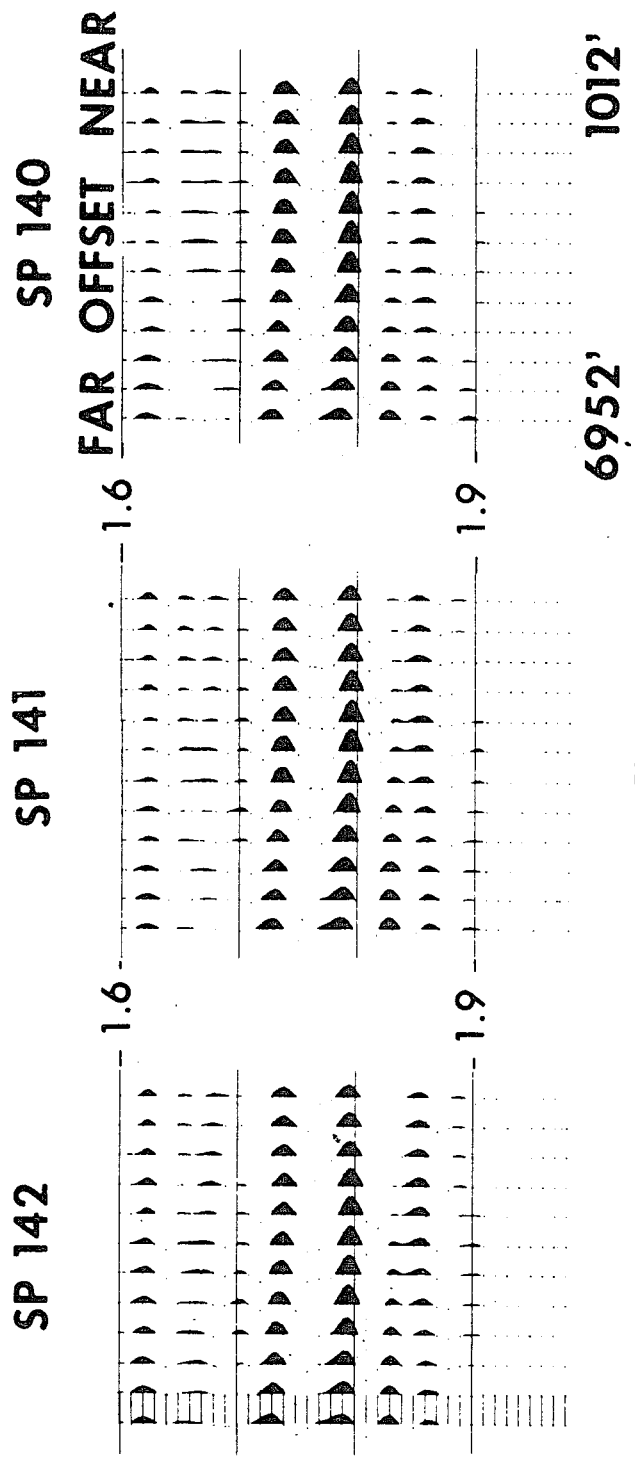

Common-depth-point gathers from 3 locations, A, B and C of FIG. 12, are shown in FIGS. 13(a), 13(b) and 13(c). Both single-fold and 10-fold summed gathers are shown for locations A and B, while only the summed gather is shown for location C. Shot-to-group offset for all gathers increases to the left, as indicated with the minimum and maximum trace offset distances annotated. These distances change on the summed gathers because the summing is done over 4 offsets.

Note the strong amplitude increase with increasing offset at locations A and B. The 10-fold summing obviously improves signal-to-noise ratios and an amplitude increase by a factor of about three is indicated from near to far offset. Gathers at location C, however, show no indication of amplitude increase with offset, and in fact show a decrease. This possibility indicates an absence of gas in the vicinity of location C. This possibility is also supported by the presence of a gas-water contact in a well structurally projected at about SP-120.

EXAMPLE II

Figure 14:
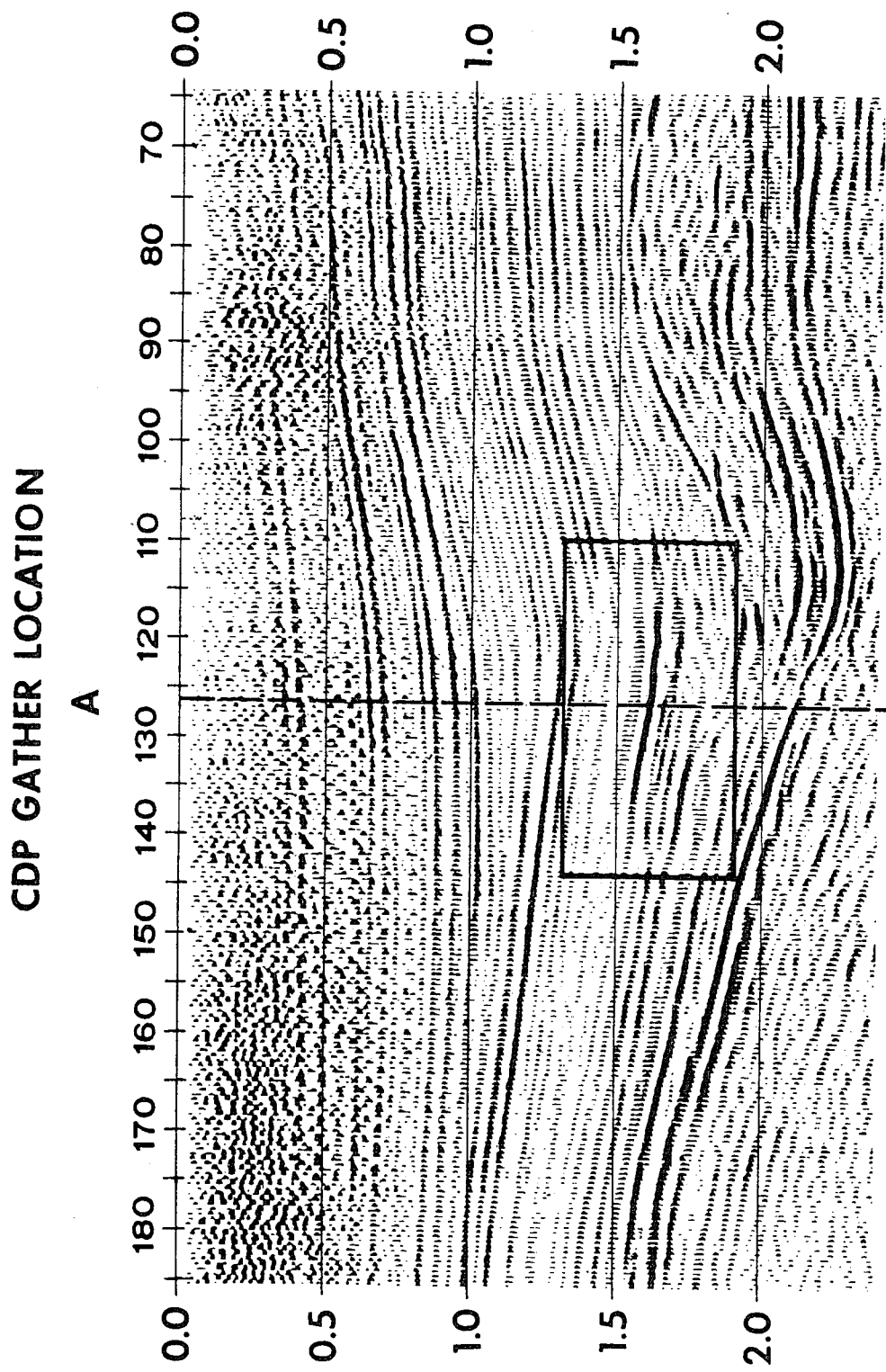

Seismic data were obtained in the Fallon Basin of Nevada and are depicted in CDP-gathered format in FIG. 14. A well was drilled at SP-127 in FIG. 14. A seismic amplitude assembly anomaly is indicated at location A at about 1.6 seconds. Upon drilling, the amplitude anomaly was found to originate from two basaltic layers, 100 feet and 60 feet in thickness. As its structural position indicates, this well was a stratigraphic test in an undrilled basin.

Figure 15:
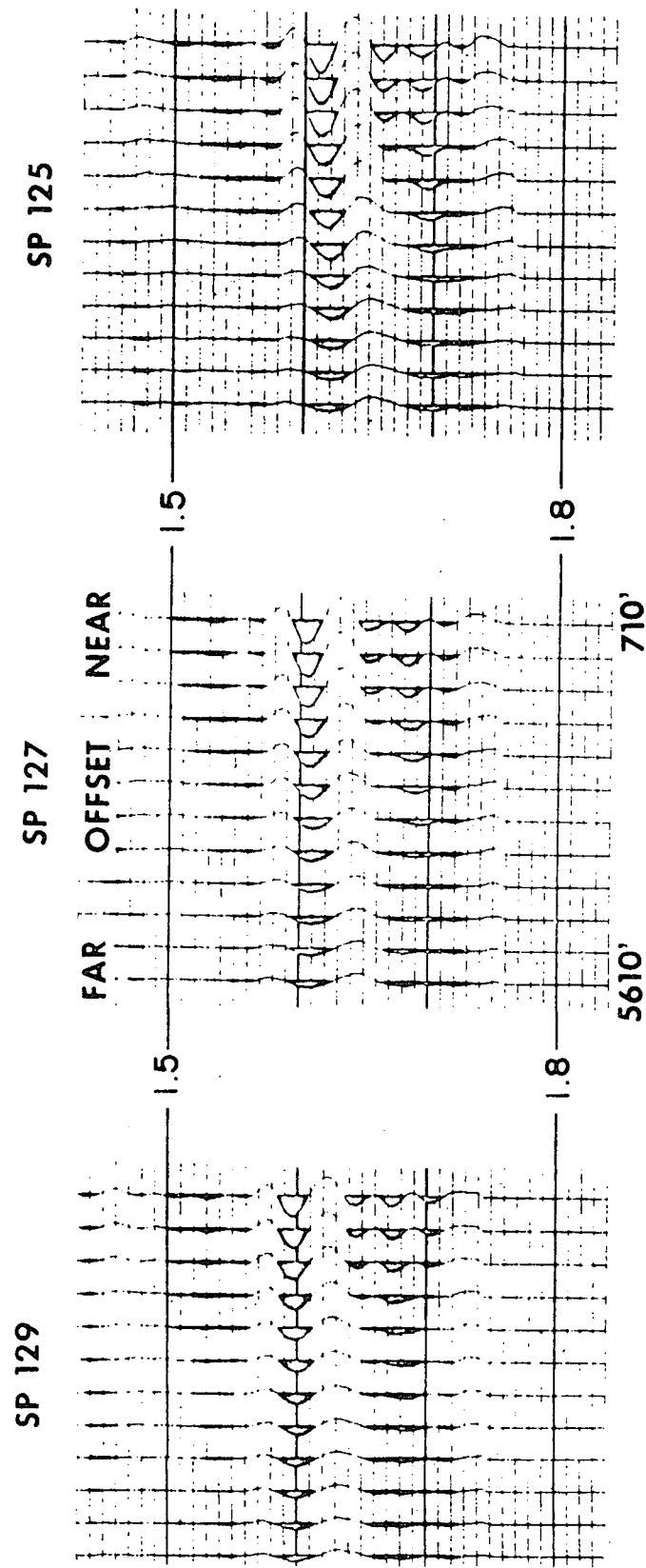

The common-depth-point gathers at the well location are shown in FIG. 15. Here, there is a strong indication of reflection amplitude decrease with inceasing offset. This finding is consistent with the absence of gas in the geologic section and the expected Poisson's ratios for sediments and basalt.

EXAMPLE III

Figure 16:
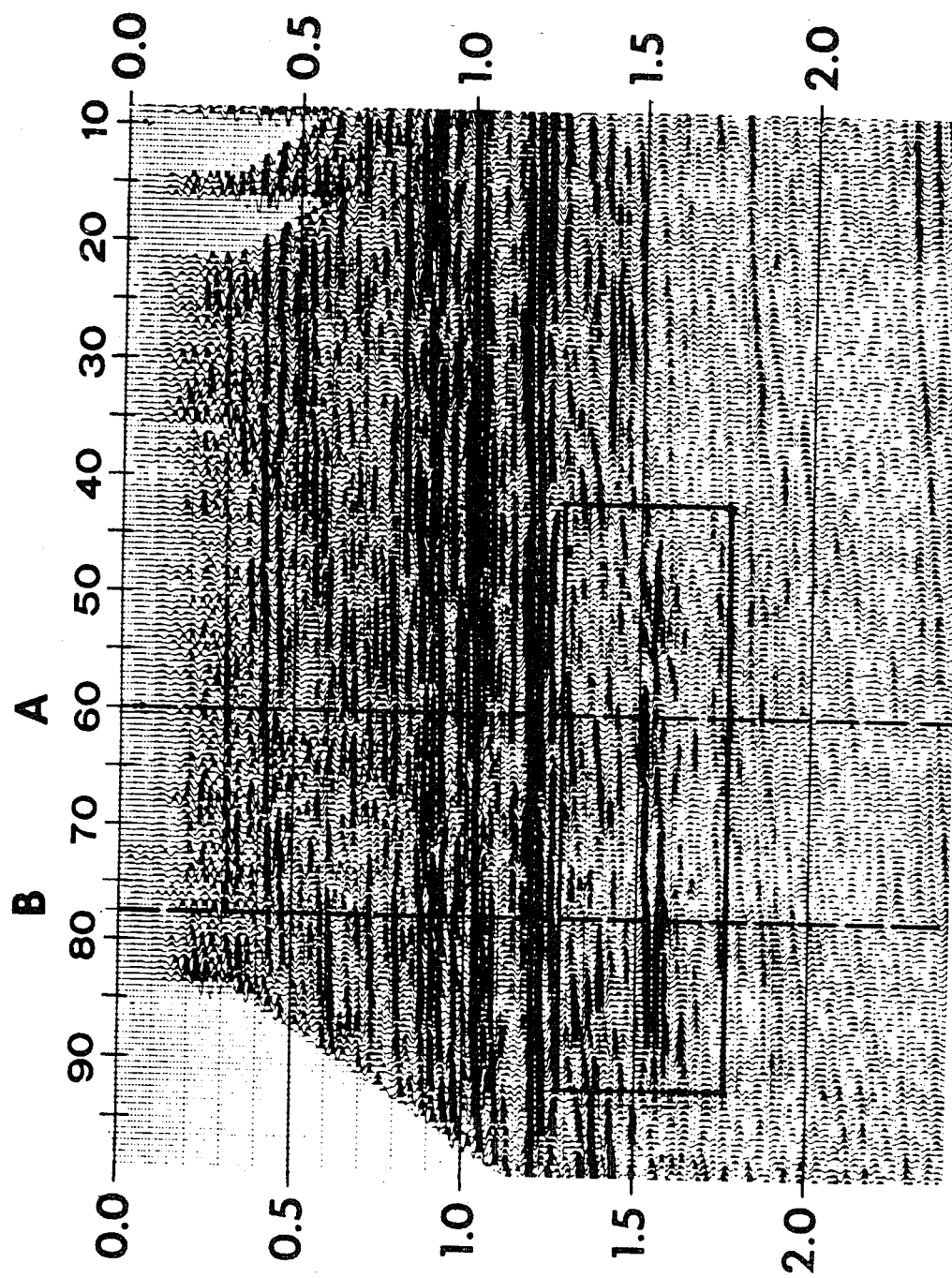

Seismic data obtained from an area in the Sacramento Valley, Calif., are depicted in FIG. 16. A well was drilled at SP-61. Note the amplitude anomaly extending from about SP-45 to about SP-90 at 1.5 seconds. However, the amplitude anomaly was found to originate from a high-velocity conglomerate layer.

Figure 17A:
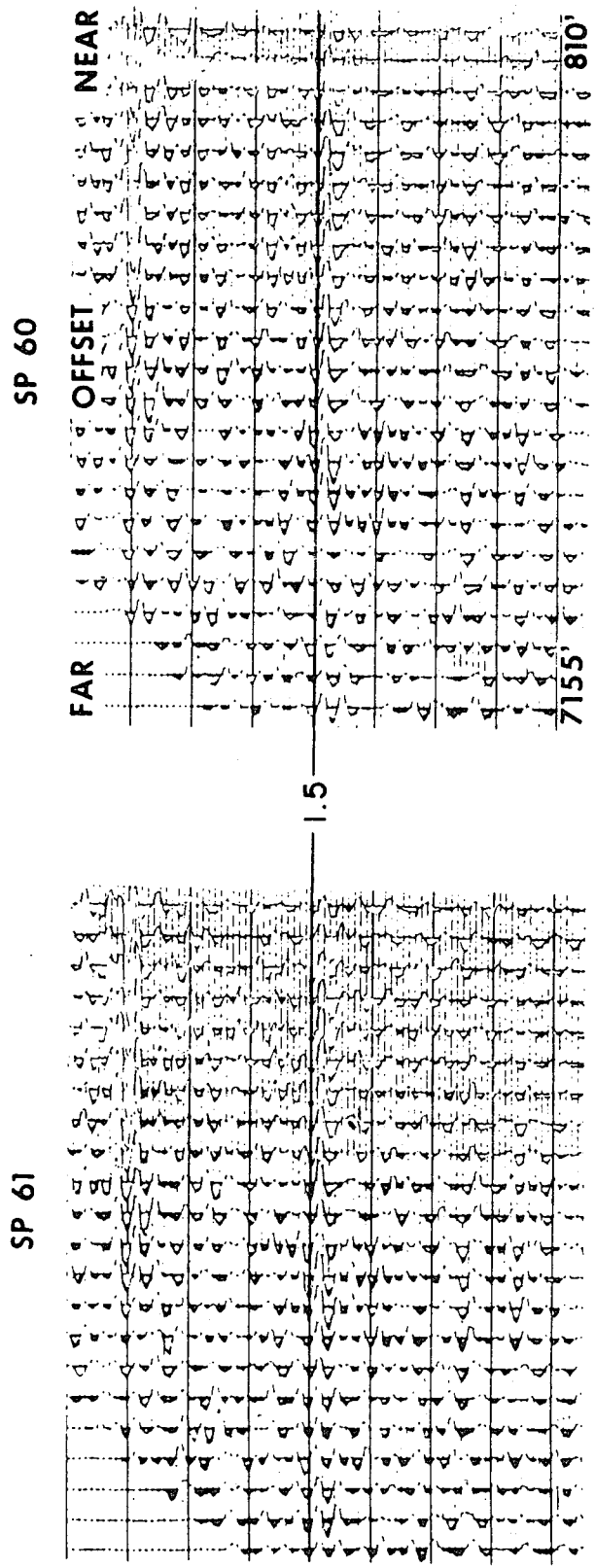
Figure 17B:
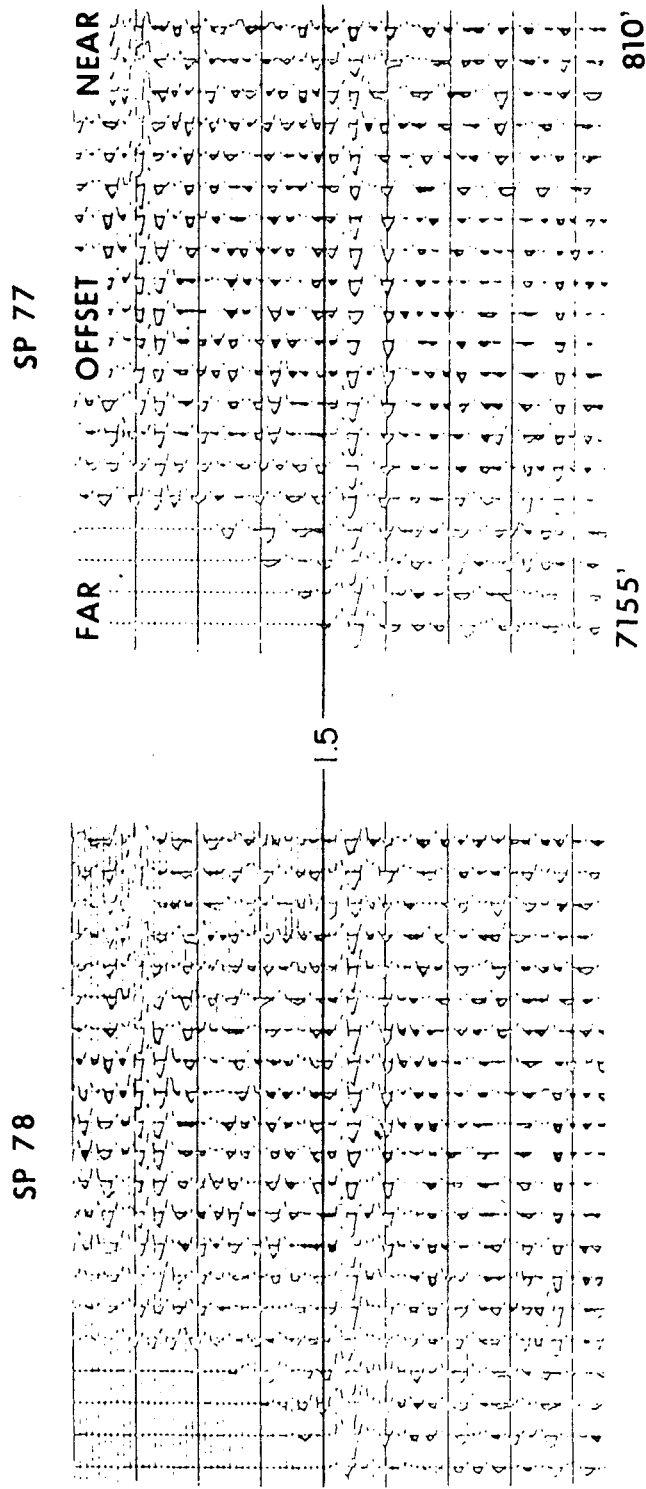

Shown in FIGS. 17(a) and 17(b) are the singlefold common-depth-point gathers at two locations: location A at the well and location B, about ½ mile to the West. The gathers at location A do indeed indicate the absence of gas, i.e., no noticeable increase in reflector amplitude with offset. However, the gathers at location B do show a slight increase in amplitude with offset, i.e., possible gas.

EXAMPLE IV

Figure 18:
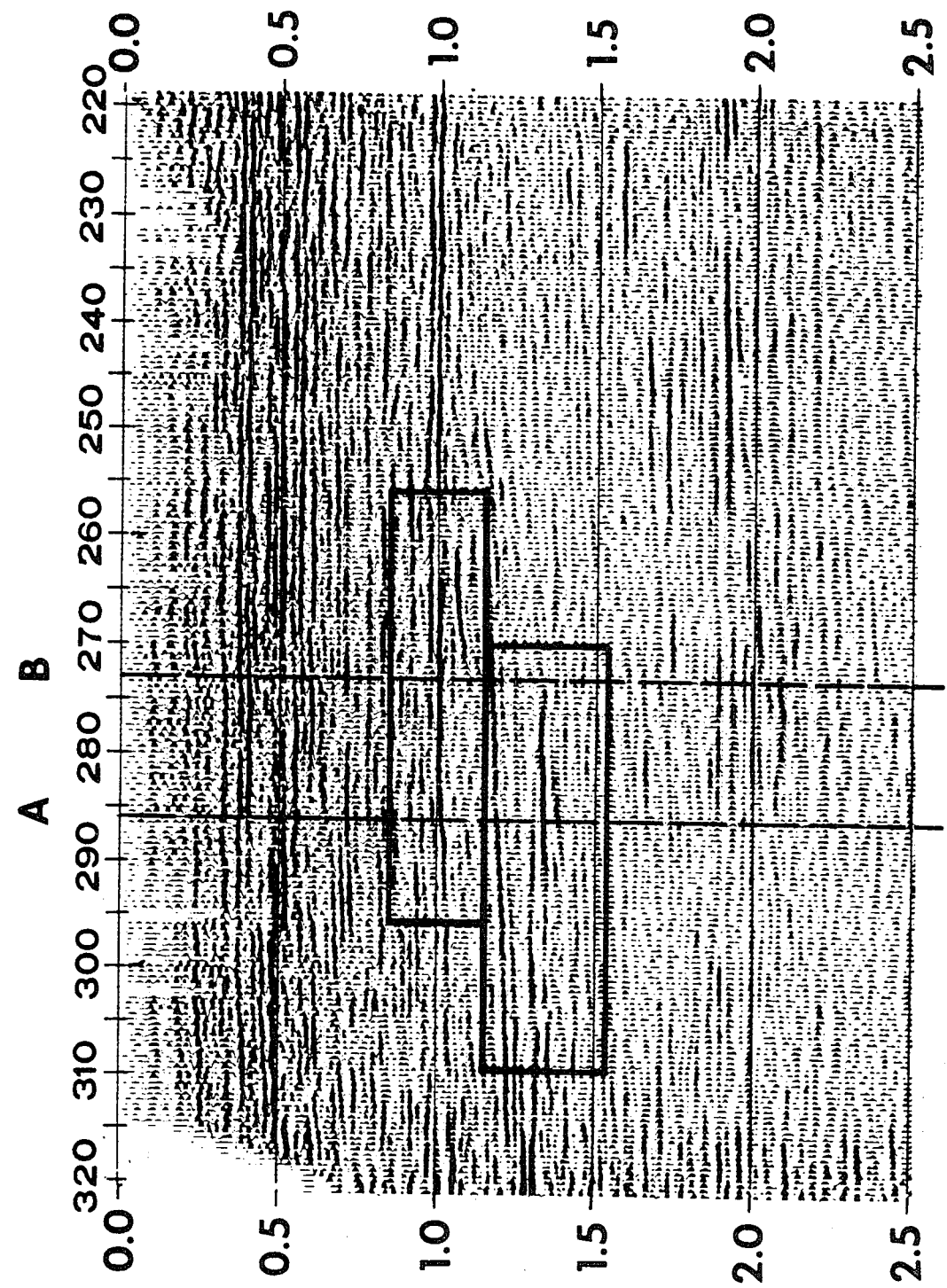

Seismic data were obtained for another area and are depicted in FIG. 18. The possible gas-related amplitude anomalies are located (i) between SP-270 and -310 at about 1.3 seconds and (ii) between SP-250 and -300 at about 1.0 second.

Figure 19A:
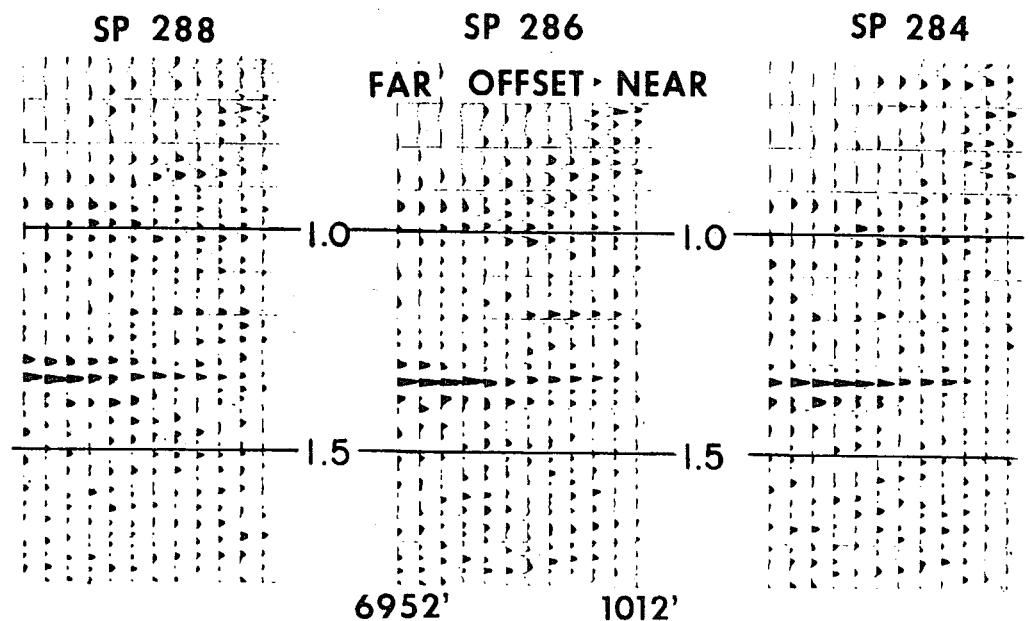
Figure 19B:
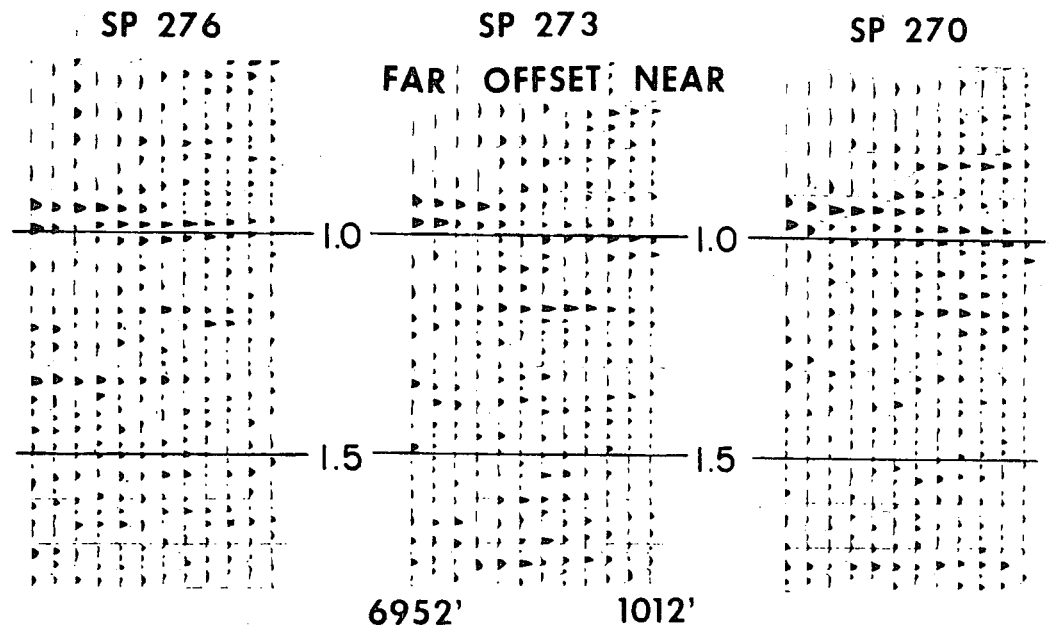

The ten-fold CDP gathers at locations A and B of FIG. 18 are shown in FIGS. 19(a) and 19(b), respectively. Here, there do indeed appear to be indications of amplitude increase with offset. In FIG. 19(a), the anomaly appears over a region where amplitude increases with offset. In FIG. 19(b), the anomaly at 1.0 seconds is thought to be related to low-velocity shale.

EXAMPLE V

Figure 20:
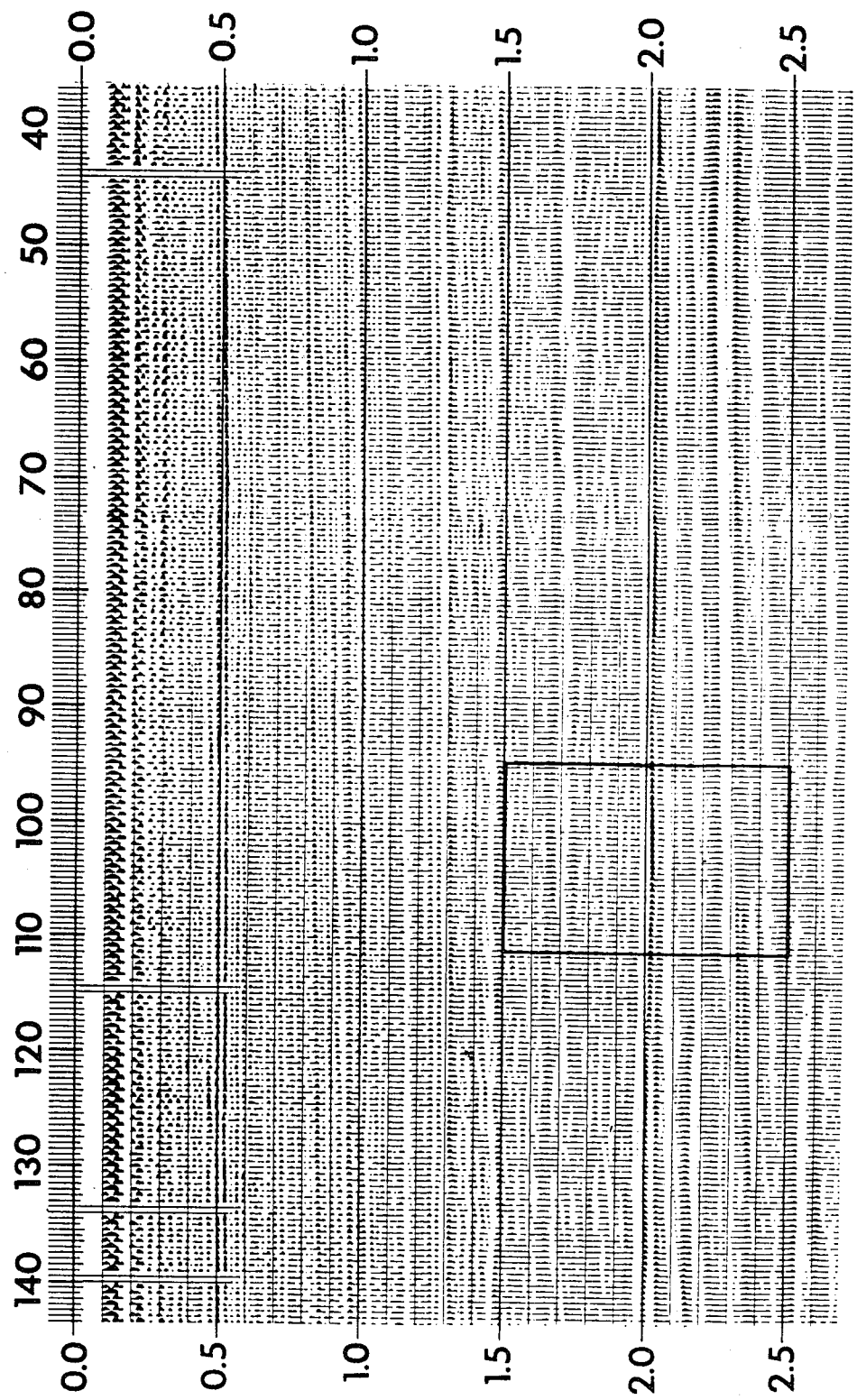

Seismic data were obtained for another area and are depicted in FIG. 20. The geologic section was limestone embedded in shale. The gas-related anomaly is located over the indicated rectangular area of the Figure.

Figure 21:
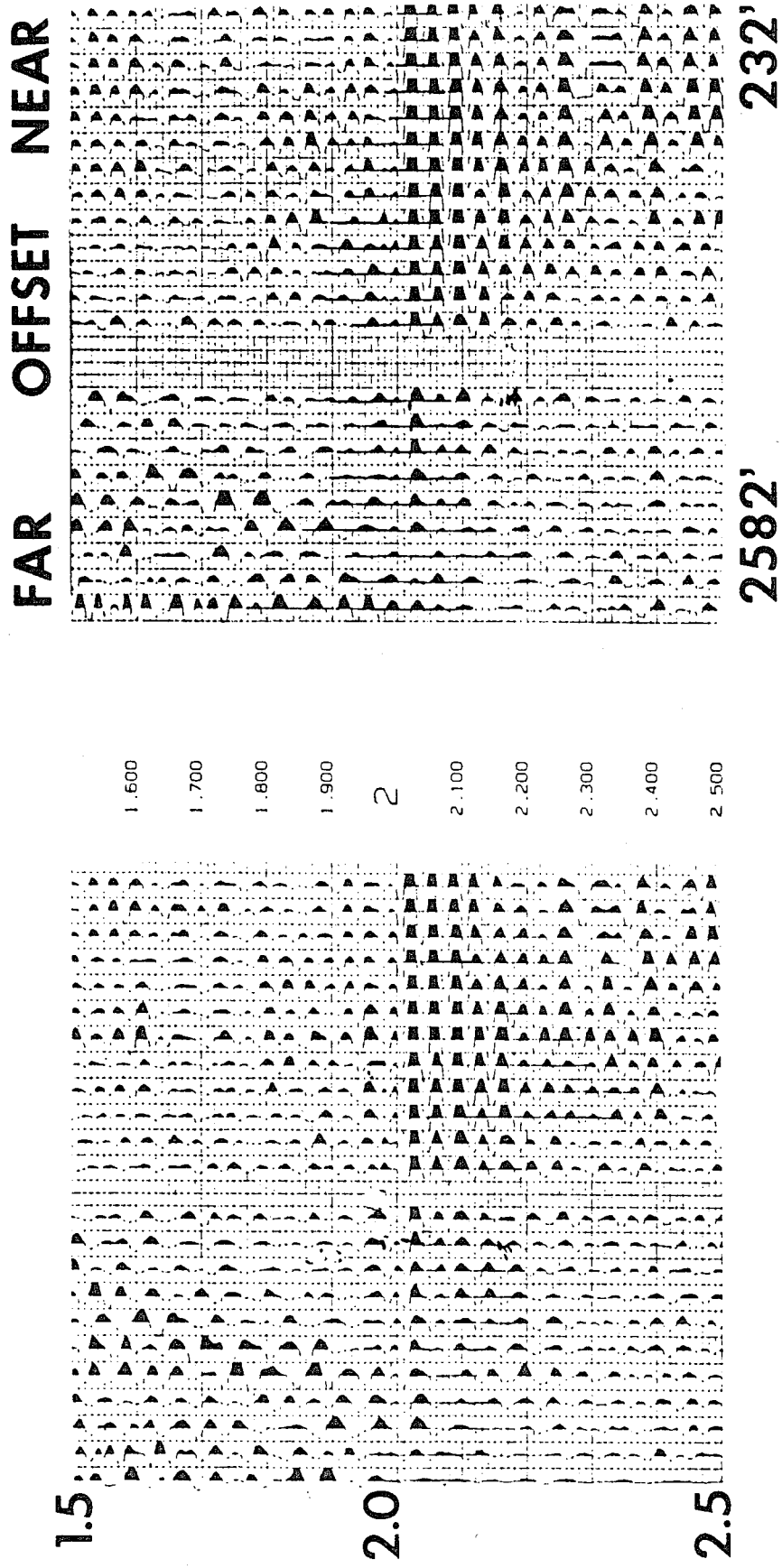

Here, note that for this lithology, gas is indicated by decreases in amplitude with offset, as shown in FIG. 21 representing CDP gathers at surface locations 102 and 103 of FIG. 20, as viewed respectively from right to left in FIG. 21.

LITHOLOGIC INTERPREATION OF EXAMPLES I-V

The complexity of seismic wave travel within the earth is well-documented, as indicated hereinbefore. Not only can both reflected and compressional and shear waves be generated at a source point of the seismic exploration system, but converted waves can be regenerated as such waves propagate through the earth. At perpendicular angles of incidence (of such waves with an acoustic boundary) such conversion is minimum (compressional to shear or vice versa). But as the angle of incidence increases, conversion from wave type to another can become significant.

Equations which express partitioning of energy when a plane wave impinges on an acoustic-impedance contrast at different incidence angles are termed "Zoepritz's equations". In the general case four waves are generated: the reflected P-wave, the reflected S-wave, the transmitted P-wave and the transmitted S-wave.

The partition of energy among these is found from the four boundary conditions which require solution of equations of (i) continuity of normal tangential displacement and (ii) stress at the boundary of interest.

Assume, for example, a plane P-wave is incident on a plane interface having an amplitude of unity; then Snell's laws and the principle of continuity of tangential and normal displacement yield the following equations:

$$-\sin 2\theta_{p1} + A \sin 2\theta_{p1} + \frac{V_{p1}}{V_{S1}} B \cos 2\theta_{S1} = \quad (A)$$

$$\frac{-\rho_2 V_{S2}^2 V_{p1}}{\rho_1 V_{S1}^2 V_{p2}} C \sin 2\theta_{p2} + \frac{\rho_2 V_{S2} V_{p1}}{\rho_1 V_{S1}^2} D \cos 2\theta_{S2}.$$

$$\cos 2\theta_{\theta S1} + A \cos 2\theta_{S1} - \frac{V_{S1}}{V_{p1}} B \sin 2\theta_{S1} = \quad (B)$$

$$\frac{\rho_2 V_{p2}}{\rho_1 V_{p1}} C \cos 2\theta_{S2} + \frac{\rho_2 V_{S2}}{\rho_1 V_{p1}} D \sin 2\theta_{S2}.$$

where: A=the amplitude of the reflected P-wave; C=the amplitude of the refracted P-wave; B=the amplitude of the reflected SV wave and D=the amplitude of the refracted SV wave. $\theta_{p1}$=angle of reflection of the P-wave; $\theta_{s1}$=the angle of reflection of the S-wave in medium 1 having velocities of $v_p$, and $V_{s1}$ and a density of $p_1$; $\theta_{p2}$=and $\theta_{s2}$=angles of refraction of the P- and S-waves in medium 2 which velocities are $V_{p2}$ and $V_{s2}$ have a density of $p_2$. It is obvious that if $\sin \theta_{p2}$ or $\sin \theta_{s2}$ exceed 1, total reflection occurs. That is to say, respective refracted waves vanish.

Normally, these equations are seldom used in calculations affecting exploration geophysics, in spite of the fact that modern collection techniques use long off-sets in common gathers and involve significant angles of incidence. Reason: the velocity and density contrasts between layers are usually not large. But where the medium of interest contains a hydrocarbon gas such as methane, certain unobvious lithologic conclusions can be drawn.

(1) In Examples I, III and IV set forth above, seismic data associated with proven gas fields illustrate amplitude characteristics or common-depth-point gathers. The presence of gas is indicated by observing a strong amplitude increase with offset.

Further analysis of data associated with the three Examples, say using Equations (A) and (B), indicate that the velocity of the host strata increased dramatically in the presence of a gas-saturated strata so that on the whole, its velocity becomes greater than that of the capping strata. On the other hand, without the presence of entrained hydrocarbon gas velocity of such host strata is less than that of the capping medium and amplitude anomalies decrease slightly with offset.

Lithologic studies also indicate that the gas-bearing strata in each Examples I, III and IV was a relatively high porosity sandstone capped by a relatively impervious shale.

Hence in those cases, where a seismic interpreter observes common events in a series of centerpoint gathers and he sees amplitude change (from set-to-set that are decreasing with offset) dramatically increases with offset, then he can conclude that the common strata configuration of the section is more likely than not, a high porosity sandstone capped by a relatively impervious shale.

(2) In Example V, set forth above, a further illustration of actual seismic data indicates that, if the common event amplitude of the sets of gathers decreased with offset, this fact was indicative of the presence of gas if the lithologic character was a low porosity limestone capped by a rather impervious shale. In this case, the rather low porosity limestone has such a stiff lithologic framework, that the presence of the hydrocarbon gas has no effect on partitioning effects on the incident energy.

I.e., to say, calculations using Equations (1) and (2), supra, indicate that in the presence of a gas-saturated limestone, the velocity of that strata remains constant at a level that's higher than that of the capping shale.

Hence in those regions where one has centerpoint gathers where common events are indicated, and analysis of those events show that their amplitudes decrease with offset and there is gas present in the host strata of interest, then more likely than not, the strata of interest is a low-porosity limestone underlying an impervious shale.

It should thus be understood that the invention is not limited to any specific embodiments set forth herein, as variations are readily apparent, and thus the invention is to be given the broadest possible interpretation within the terms of the following claims.

What is claimed is:

1. A method for determining lithology of gas-bearing strata in the earth using high-intensity amplitude events in seismic records, comprising the steps of:
   (a) generating seismic data, including a record of signals from acoustic discontinuities associated with said strata of interest by positioning and employing an array of sources and detectors such that centerpoints between selected pairs of sources and detectors form a series of centerpoints along a line of survey, said recorded signals being the output of said detectors;
   (b) by means of automated processing means, statically and dynamically correcting said recorded signals to form corrected traces whereby each of said corrected traces is associated with a centerpoint horizontally midway between a source-detector pair from which said each corrected trace was originally derived;
   (c) by means of automated processing means, indexing said corrected traces in two dimensions whereby each of said corrected traces is identified in its relationship to neighboring traces on the basis of progressive changes in horizontal offset value versus progressive changes in common centerpoint location;
   (d) displaying a series of said traces of step (c) on a side-by-side basis as a function of progressively changing horizontal offset values, said displayed traces all being associated with at least the same general common group of centerpoints whereby progressive change in a high-intensity amplitude event from trace to trace of said displayed traces as a function of progressive change in horizontal offset value, more likely than not relates to reflections from acoustic discontinuities associated with strata containing gaseous hydrocarbons; and
   (e) determining lithologic character of the strata containing the gaseous hydrocarbons based on the direction of the progressive change in the amplitude event as a function of horizontal offset.

2. The method of claim 1 in which step (e) is further characterized by the substeps of
  (a) observing that the amplitude event of interest increases with horizontal offset, and
  (b) concluding that the lithologic character of the strata containing the gaseous hydrocarbons is more likely than not a sandstone underlying an impervious shale.

3. The method of claim 1 in which step (e) is further characterized by the substeps of
  (a) observing that the amplitude event of interest decreases with horizontal offset, and
  (b) concluding that the lithologic character of the strata containing the gaseous hydrocarbons is more likely than not a limestone underlying an impervious shale.

4. The method of claim 1 in which step (c) is further characterized by the substeps of:
  (a) selecting a first series of indexed traces within a common offset, common centerpoint window of predetermined dimensions; and
  (b) summing said first series of selected traces to form a summed trace.

5. The method of claim 4 with the additional substeps of:
  (e) incrementing the window at least in the common offset dimension to select a second series of traces; and
  (d) summing the second series of selected traces to form a second summed trace.

6. The method of claim 1 in which step (d) is a side-by-side display of said summed traces as a function of progressively changing composite horizontal offset values whereby progressive changes in said high-intensity amplitude event are more easily identifiable.

7. The method of claim 4 in which the dimension of the window of step (a) is four offset values high by five centerpoint locational points long.

8. A method for converting an original multitrace seismic record into an improved section having increased capability as to the lithologic nature of high-intensity amplitude events related to reflections from subsurface strata containing gaseous hydrocarbons, said improved section being composed of a plurality of amplitude-versus-horizontal offset-and-time traces, said original record consisting of a plurality of multitrace seismic traces of amplitude-versus-horizontal coordinate-and-time, each of said traces constituting energy derived in association with a particular source-detector pair of known horizontal offset and of known centerpoint location, and representing, in part, event reflections from said subsurface strata, said conversion comprising the steps of:
  (a) classifying said original traces on the basis of common but progressively changing horizontal offset values and common but progressively changing common centerpoint locations, whereby each trace is identified by a centerpoint location common to at least another trace and a known horizontal offset value;
  (b) displaying at least said each trace and said another trace associated with said common centerpoint location, as a function of progressively changing horizontal offset values to form at least a segment of said improved section whereby progressive change in a high-intensity amplitude event common to said each trace and said another trace identified as a function of progressive change in horizontal offset, relates to reflections from acoustic discontinuities associated with strata containing gaseous hydrocarbons; and
  (c) determining lithologic character of the strata containing the gaseous hydrocarbons based on the direction of progressive change in the amplitude event common to said traces.

9. The method of claim 8 in which said common centerpoint location of said another classified trace of step (a) is also common to a plurality of additional other traces, each having known but progressively changing horizontal values with respect to said another trace.

10. The method of claim 8 in which step (c) is further characterized by the substeps of
  (i) observing that the amplitude event of interest increases with horizontal offset, and
  (ii) concluding that the lithologic character of the strata containing the gaseous hydrocarbons is more likely than not a sandstone underlying an impervious shale.

11. The method of claim 8 in which step (c) is further characterized by the substeps of
  (a) observing that the amplitude event of interest decreases with horizontal offset, and
  (b) concluding that the lithologic character of the strata containing the gaseous hydrocarbons is more likely than not a limestone underlying an impervious shale.

12. The method of claim 9 in which the step (b) is a side-by-side display of said each trace, said another trace, and said additional other traces as a function of progressively changing horizontal offset values so that progressive change in said high-intensity event in said improved section is more easily identifiable.

13. The method of claim 8 in which step (b) is further characterized by:
  (i) indexing all of said traces in two dimensions whereby each of said traces is identified in its relationship to neighboring traces on the basis of progressive changes in horizontal offset value versus progressive changes in common centerpoint location;
  (ii) selecting a first series of indexed traces within a common offset, common centerpoint window of predetermined absolute dimensions; and
  (iii) summing the first series of selected traces to form a first summed trace.

14. The method of claim 13 with the additional steps of:
  (iv) incrementing the window in at least the common offset dimension to select a second series of traces; and
  (v) summing the second series of selected traces to form a second summed trace.

15. The method of claim 13 in which step (b) is a side-by-side display of said summed traces of substep (iii) as a function of progressively changing composite horizontal values to form said improved section whereby progressive change in said high-intensity amplitude event is more easily identifiable.

* * * * *